United States Patent
Gebreselasie et al.

(10) Patent No.: US 10,263,418 B2
(45) Date of Patent: Apr. 16, 2019

(54) METHOD TO PROTECT SENSITIVE DEVICES FROM ELECTROSTATIC DISCHARGE DAMAGE

(71) Applicant: GLOBALFOUNDRIES INC., Grand Cayman (KY)

(72) Inventors: Ephrem G. Gebreselasie, South Burlington, VT (US); Icko E. T. Iben, Santa Clara, CA (US); Alain Loiseau, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/971,265

(22) Filed: May 4, 2018

(65) Prior Publication Data
US 2018/0254630 A1  Sep. 6, 2018

Related U.S. Application Data

(62) Division of application No. 14/635,005, filed on Mar. 2, 2015, now Pat. No. 10,008,848.

(51) Int. Cl.
*H02H 9/04* (2006.01)

(52) U.S. Cl.
CPC .................. *H02H 9/041* (2013.01)

(58) Field of Classification Search
CPC ...................................................... H02H 9/041
(Continued)

(56) References Cited

U.S. PATENT DOCUMENTS 5,587,857 A   12/1996  Voldman et al.
5,748,412 A    5/1998  Murdock et al.
(Continued)

FOREIGN PATENT DOCUMENTS

JP   11273004 A  * 10/1999
WO  03105227      12/2003

OTHER PUBLICATIONS

Machine Translation of Nagaya Japanese Patent Document JP H11273004 A Oct. 8, 1999.*
(Continued)

*Primary Examiner* — Kevin J Comber
(74) *Attorney, Agent, or Firm* — Anthony Canale; Andrew M. Calderon; Roberts Mlotkowski Safran Cole & Calderon P.C.

(57) ABSTRACT

ESD protection circuitry that includes one, or more, of the following features, characteristics and/or advantages: (i) use of different "diode types" (for example, Schottky type, PN type, p-type diode-connected field-effect transistor (FET) type, NFET type)) in a series-connected diode set (connected in series with respect to a device-under-protection) and a parallel-connected diode set (connected in parallel with respect to a device-under-protection and the series-connected diode set); (ii) a FET is connected in series with a target device such that the FET's gate can be turned on during normal operation and the FET's gate is resistively coupled to the FET's source; and/or (iii) two FETs are connected in series with a target device such both FETs gates can be turned on during normal operation, one FET's gate is resistively coupled to its source, and the other FET's gate is electrically coupled to its drain.

12 Claims, 15 Drawing Sheets

(58) Field of Classification Search
USPC .......................................................... 361/56
See application file for complete search history.

(56) References Cited

U.S. PATENT DOCUMENTS

| | | | |
|---|---|---|---|
| 5,777,829 | A | 7/1998 | Voldman et al. |
| 6,704,173 | B1 | 3/2004 | Lam et al. |
| 6,710,983 | B2 | 3/2004 | Voldman |
| 6,891,702 | B1 | 5/2005 | Tang |
| 6,972,933 | B1 | 12/2005 | Wada et al. |
| 7,009,820 | B1 | 3/2006 | Hogg |
| 7,489,482 | B2 | 2/2009 | Ono et al. |
| 7,548,405 | B2 | 6/2009 | Czarnecki et al. |
| 8,107,196 | B2 | 1/2012 | Bandy, IV et al. |
| 8,199,444 | B2 | 6/2012 | Golcher et al. |
| 8,427,796 | B2 | 4/2013 | Worley et al. |
| 8,462,457 | B1 | 6/2013 | Sutardja |
| 8,514,534 | B2 | 8/2013 | Bandy, IV et al. |
| 8,760,791 | B1 | 6/2014 | Sutardja |
| 8,760,827 | B2 | 6/2014 | Campi, Jr. et al. |
| 8,908,334 | B1 | 12/2014 | Gebreselasie et al. |
| 2003/0210501 | A1 | 11/2003 | Voldman |
| 2005/0141143 | A1 | 6/2005 | Ono et al. |
| 2006/0018070 | A1 | 1/2006 | Iben |
| 2008/0151447 | A1 | 6/2008 | Czarnecki et al. |
| 2008/0278835 | A1 | 11/2008 | Dakroub et al. |
| 2009/0059440 | A1 | 3/2009 | Moe et al. |
| 2009/0154031 | A1 | 6/2009 | Bumanlag et al. |
| 2012/0033332 | A1 | 2/2012 | Bandy, IV et al. |

OTHER PUBLICATIONS

Batard et al., "New High Power Diode Model With Both Forward and Reverse Recovery," Fifth International Conference on Power Electronics and Variable-Speed Drives, Oct. 26-28, 1994, pp. 447-452, DOI: 10.1049/cp:19941007.

Chun, Jung-Hoon, "ESD Protection Circuits for Advanced CMOS Technologies", Submitted to the Department of Electrical Engineering and the Committee on Graduate Studies of Stanford University, Jun. 2006, 137 pages.

Doan et al., "Reliability Characteristics of IrMn Dual Synthetic Spin Valves," IEEE Transactions on Magnetics, vol. 36, Issue 5, Sep. 2000, pp. 2608-2610. DOI: 10.1109/20.908531.

Gauthier et al., "Investigation of Voltage Overshoots in Diode Triggered Silicon Controlled Rectifiers (DTSCRs) Under Very Fast Transmission Line Pulsing (VFTLP)," 31st EOS/ESD Symposium, Aug. 30-Sep. 4, 2009.

Grund et al., "VF-TLP Systems Using TDT and TORT for Kelvin Wafer Measurements and Package Level Testing," Electrical Overstress/Electrostatic Discharge Symposium, Sep. 19-23, 2004, pp. 1-8. DOI: 10.1109/EOSESD.2004.5272811.

Iben, I., "A Study of Cable Discharge Events and Other Short Time Pulses of Cabled MR Sensors," 3oth Electrical Overstress/Electrostatic Discharge Symposium, Sep. 7-11, 2008, pp. 262-271.

Iben, I., "A Thermodynamic Study of ESD and EOS Induced Pinned Layer Reversal in GMR Sensors," 31st EOS/ESD Symposium, Aug. 30-Sep. 4, 2009.

Iben et al., "Diode Protection of GMR Sensors", 2011 33rd Electrical Overstress/Electrostatic Discharge Symposium (EOS/ESD), Sep. 11-16, 2011, pp. 1-11, Anaheim, CA, 978-1-58537-193-8.

Iben, I., "Dynamic Temperature Rise of Shielded MR Sensors During Simulated Electrostatic Discharge Pulses of Variable Pulse Width," 2004 Electrical Overstress/Electrostatic Discharge Symposium, Sep. 19-23, 2004, pp. 1-10. DOI: 10.1109/EOSESD.2004.5272812.

Iben, I., "Thermal characteristics of a PtMn GMR sensor subjected to square wave EOS pulses," 2006 Electrical Overstress/Electrostatic Discharge Symposium, Sep. 10-15, 2006, pp. 120-130. ISBN: 978-1-5853-7115-0.

Iben et al., "Tunable Diode Protection for GMR and TMR Sensors", 2007 EOS/ESD 29th Electrical Overstress/Electrostatic Discharge Symposium, Sep. 16-21, 2007, Anaheim, CA, pp. 2B.3-1-2B.3-9, 978-1-58537-136-5, doi: 10.1109/EOSESD.2007.4401741.

Lauritzen et al., "A Simple Diode Model with Reverse Recovery," IEEE Transactions on Power Electronics, vol. 6, Issue 2, Apr. 1991, pp. 188-191. DOI: 10.1109/63.76804.

Ma et al., "A Simple Power Diode Model with Forward and Reverse Recovery," IEEE Transactions on Power Electronics, vol. 8, Issue 4, Oct. 1993, pp. 342-346. DOI: 10.1109/63.261002.

Manouvrier et al., "Characterization of the Transient Behavior of Gated/STI Diodes and their Associated BJT in the COM Time Domain," 29th Electrical Overstress/Electrostatic Discharge Symposium, Sep. 16-21, 2007, pp. 3A.2-1-3A.2-10. DOI: 10.1109/EOSESD.2007.4401748.

Simmons et al., "High-Pinning Iridium-Manganese-Chromium (IrMnCr) Read Sensors for High Reliability & Stability," Hitachi Global Storage Technologies, © 2006 Hitachi Global Storage Technologies.

Tag-At et al., "A Study on the Application of On-Chip EOS/ESD Full-Protection Device for TMR Heads," 2010 32nd Electrical Overstress/Electrostatic Discharge Symposium, Oct. 3-8, 2010, pp. 1-8.

U.S. Appl. No. 14/529,326 entitled "Electrostatic Discharge Protection for a Magnetoresistive Sensor", filed Oct. 31, 2014.

Voldman et al., "Electrostatic Discharge (ESD) Protection of Giant Magneto-resistive (GMR) Recording Heads With Silicon Gennanium Technology", 2004 EOS/ESD Symposium, Grapevine, TX, pp. 1-9, Sep. 19-23, 2004, DOI: 10.1109/EOSESD.2004.5272583.

Wallash et al., "A Study of Diode Protection for Giant Magnetoresistive Recording Heads," 1999 Electrical Overstress/Electrostatic Discharge Symposium, Sep. 28-30, 1999, pp. 385-390. DOI: 10.1109/EOSESD.1999.819088.

Wallash et al., "Magnetic Changes in GMR Heads Caused by Electrostatic Discharge," IEEE Transactions on Magnetics, vol. 34, Issue 4, Jul. 1998, pp. 1519-1521. DOI: 10.1109/20.706602.

Yamazaki et al., "Forward Transient Behavior of PiN and Super Junction Diodes," Proceedings of 2004 International Symposium on Power Semiconductor Devices and ICs, May 24-27, 2004, pp. 197-200. DOI: 10.1109/ISPSD.2004.1332899.

"Smart FET Protection Features", On Semiconductor, pp. 1-4, 2012.

\* cited by examiner

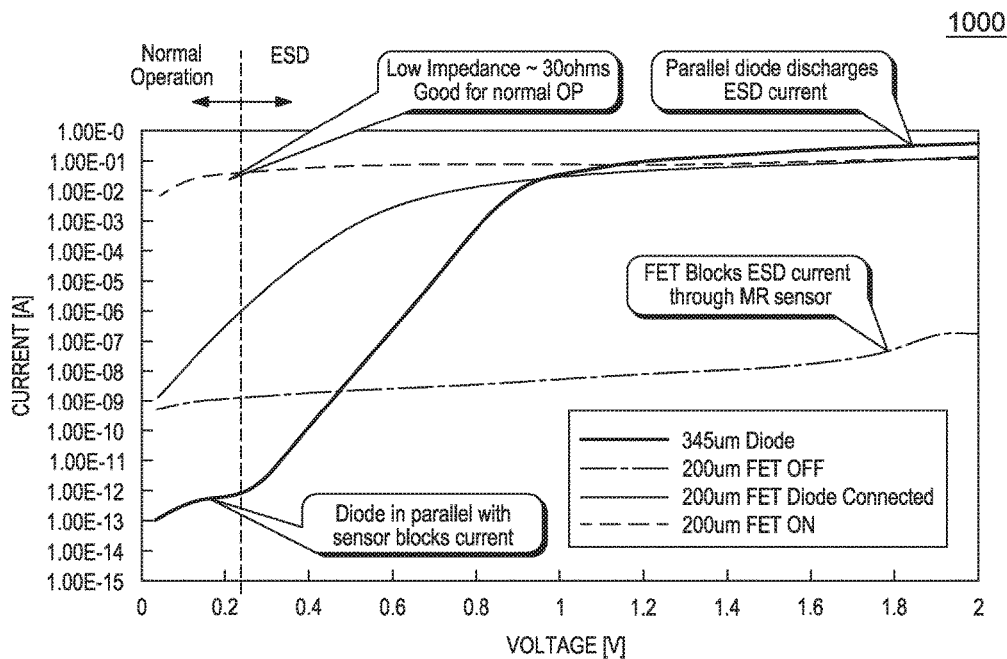

FIG. 10

| CHARACTERISTICS | HBM | MM | CDM |
|---|---|---|---|
| Equivalent Circuit | 1.5kΩ + 100pF in series | 0.5-1.0μh + 200pF in series | Field plate to chip capacitance only |
| Discharge Path | Between ANY two pins | Between ANY two pins | One pin only (Discharge Pin) |
| Simulates | Human discharging through chip | Metal tool discharging through chip | Charged chip discharging to ground |
| Discharge Waveform | Exponential Decay Time Const = 150ns | 11-16 MHz damped Oscillation | ~1 Ghz damped Oscillation |
| On-Chip stress characteristics | Lowest Current and Voltage, longest duration I(HBM)=V(HBM)/1.5kΩ | Intermediate Current, Voltage and duration | Highest Current, Voltage and shortest duration |
| Failure Mechanisms | Thermal failures: MOSFET second breakdown, interconnect fusing, gate oxide damage | Junction damage, Interconnect fusing, gate oxide damage | Gate oxide damage and interconnect damage |

| MODEL | VOLTAGE LEVEL [V] | PEAK CURRENT MAGNITUDE [A] |
|---|---|---|
| HBM | 1000V | 0.6-0.74A |
| HBM | 2000V | 1.2-1.48A |
| HBM | 3000V | 1.8-2.22A |
| MM | 100V | 1.5-2.0A |
| MM | 200V | 2.8-3.8A |
| MM | 300V | 4.3-5.9A |
| CDM | 200V | 2-5A |
| CDM | 500V | 5.75 +/- 15%<br>5-12.5A |
| CDM | 1000V | 10-25A |

FIG. 15

TABLE 4.

| D1 | Wd | D2 | W | Cp | Z | Rdut | Icshunt | Imr Vcable | 1 mA | | 2 mA | | 3 mA | | 4 mA | |
|---|---|---|---|---|---|---|---|---|---|---|---|---|---|---|---|---|
| | mm | | mm | pF | [1GHz] Ω | Ω | (%) | V | Ids uA | Rdut Ω | Ids uA | Rdut Ω | Ids uA | Rdut Ω | Ids uA | Rdut Ω |
| X | X | X | X | 0.03 | 5305 | 41 | 0.8 | 8.5 | 0 | 41 | 0 | 41 | 0 | 41 | 0 | 41 |
| X | X | PN | 1 | 0.53 | 300 | 16.5 | 12 | 18.7 | 0 | 41 | 0 | 41 | 0 | 41 | 0 | 41 |
| X | X | NFET | 1 | 1.03 | 155 | 5.7 | 21 | 51.2 | 0 | 41 | 0 | 41 | 0 | 41 | 0 | 41 |
| X | X | SD | 1 | 6.83 | 23 | 5.6 | 64 | 52.1 | 0 | 41 | 0 | 41 | 0 | 41 | 0 | 41 |
| NFET | 4 | PN | 0.2 | 0.13 | 1224 | 1.5 | 3.2 | 190 | 0 | 380 | 0 | 230 | 0 | 140 | 0 | 110 |
| PN | 1 | PN | .05 | .055 | 2894 | 0.8 | 1.4 | 356 | 0 | 580 | 0.3 | 317 | 6 | 143 | 14 | 69 |

FIG. 16

TABLE 5.

| # | D1 | W (mm) | D2 | W (mm) | Cp (pF) | Z 1GHz (Ω) | I_cshunt (%) | R_dut (Ω) | V_cable (V) | I_rr V_cable/V_cable0 (%) | 100 μA I_ds (μA) | 100 μA R_dut (Ω) | 200 μA I_ds (μA) | 200 μA R_dut (Ω) |
|---|---|---|---|---|---|---|---|---|---|---|---|---|---|---|
| 1 | X | X | X | X | 0.03 | 5305 | 9% | 500 | 1.8 | 1.0 | 0 | 500 | 0 | 500 |
| 2 | X | X | PN | X | 0.53 | 300 | 62% | 500 | 1.8 | 1.0 | 0 | 500 | 0 | 500 |
| 3 | X | X | SD | X | 6.83 | 23 | 96% | 295 | 1.8 | 2.0 | 0 | 500 | 0 | 500 |
| 4 | X | X | NFET_1.8 | X | 1.03 | 155 | 76% | 48 | 4.4 | 2.5 | 0 | 500 | 0 | 500 |
| 5 | NFET_1.8 | 2 | PN | 0.5 | 0.28 | 568 | 47% | 39 | 5.2 | 3.0 | 5 | 3300 | 40 | 1708 |
| 6 | PN | 1 | PN | 1 | 0.53 | 300 | 62% | 39 | 5.2 | 3.0 | 10 | 4095 | 20 | 2409 |
| 7 | NFET_1.8 | 4 | NFET_1.8 | 0.2 | 0.23 | 692 | 42% | 31 | 6.3 | 3.6 | 10 | 2818 | 120 | 1188 |
| 8 | NFET_1.8 | 4 | NFET_1.8 | 0.1 | 0.13 | 1027 | 33% | 48 | 4.4 | 2.5 | 10 | 2773 | 70 | 1426 |
| 9 | NFET_1.8 | 4 | NFET_2.5 | 1 | 1.03 | 155 | 76% | 29.5 | 6.6 | 3.7 | 0 | 3000 | 6 | 1893 |
| 10 | NFET_1.8 | 2 | NFET_1.8 | 0.2 | 0.23 | 692 | 42% | 24 | 7.9 | 4.3 | 3 | 3495 | 20 | 1955 |
| 11 | NFET_1.8* | 1 | NFET_2.5 | 1 | 1.03 | 155 | 76% | 25 | 7.6 | 4.5 | 320 | 1000 | | |

FIG. 17

METHOD TO PROTECT SENSITIVE DEVICES FROM ELECTROSTATIC DISCHARGE DAMAGE

BACKGROUND OF THE INVENTION

The present invention relates generally to the field of circuitry for protecting "target devices" from electrostatic events (for example, protection against ESD (electrostatic discharge) and more particularly to ESD protection for magnetoresistive (MR) sensors.

ESD protection circuitry protects a "target device" from electrostatic events, such as electrostatic discharge. One known type of target device is magnetoresistive (MR) sensors, such as anisotropic (AMR), giant magnetoresistive (GMR), and tunneling MR (TMR) sensors. MR sensors are typically used in the magnetic storage devices to read data written on magnetic media, and are known to be highly sensitive to ESD damage. For high density storage devices such as hard disk drives (HDD), GMR and TMR sensors are typically destroyed by ESD levels of less than 1 V (volt) and down to 0.5 V and below. One known device to protect sensitive MR devices from ESD damage is called a "dissipative shunt." The dissipative shunt is useful at reducing charges on the target MR device to avoid ESD damage, but the dissipative shunt does not directly protect the device against ESD pulses.

There are several different types of diodes used in various kinds of conventional ESD protection circuitry. These diode types include: Schottky diodes, PN diodes and diode-wired (also called diode-connected) field-effect transistors (see definition of "diode types," below). Diode-wired field-effect transistors (DWFETs) are typically made by: (i) connecting the drain and source of a JFET (junction gate FET) and using the gate and source-drain as the two diode terminals; or (ii) connecting the gate and drain of a MOSFET (metal oxide semiconductor FET) and using the source-gate and drain as the two diode terminals. Herein, "DWFET" shall be construed to mean any diode that uses a FET in any manner (now known or to be developed in the future).

In conventional ESD protection circuitry, a diode is connected in parallel with the target device in order to shunt current past the target device when the voltage levels are above the normal operating point of the target device. In another known ESD protection structure (i) a first set of diode(s) in series with the target device (herein referred to a "series-connected diode set"); and (ii) a second set of diode(s) in parallel with the element formed by the series diodes with the target device (herein referred to as a "parallel-connected diode set"). It is known that a series-connected diode and a parallel-connected diode can have different "characteristics," such as carrier concentrations, dopant level, dopant types and band gap levels. However, conventional ESD protection circuitry uses only a single "diode type" for all of the diode(s) in both the series-connected diode set and the parallel-connected diode set.

SUMMARY

According to an aspect of the present invention, electrostatic discharge (ESD) protection circuitry includes: a target device; a series-connected diode(s) set including one, or more, diode(s); and a parallel-connected diode(s) set including one, or more, diodes. The series-connected diode(s) set is electrically connected in series with the target device. The parallel-connected diode(s) set is electrically connected in parallel with a circuit element formed by the series-connected diode(s) set and the target device. The diode type of at least one diode of the series-connected diode(s) set is different from the diode type of at least one of the parallel-connected diode(s) set.

According to a further aspect of the present invention, electrostatic discharge (ESD) protection circuitry can protect a magnetoresistive (MR) sensor from electrostatic events. The ESD protection circuitry includes: (i) a first series-connected field-effect transistor (FET), the first-series connected FET including a gate, a source and a drain; and (ii) control circuitry. The first series-connected FET is adapted to be electrically connected in series with the MR sensor. The control circuitry is structured, connected and/or programmed to turn on the gate of the first series-connected FET during operation of the MR sensor. The gate of the first series-connected FET is electrically connected to the source of the first series-connected FET.

According to a further aspect of the present invention, electrostatic discharge (ESD) protection circuitry can protect a magnetoresistive (MR) sensor from electrostatic events. The ESD protection circuitry includes: (i) a first series-connected field-effect transistor (FET), the first-series connected FET including a gate, a source and a drain where the source of the first series-connected FET is connected to the top lead of the MR sensor; (ii) a second series-connected field-effect transistor (FET), the second-series connected FET including a gate, a source and a drain where the source of the second series-connected FET is connected to the drain of the first series-connected FET; and (iii) control circuitry. The first series-connected FET is adapted to be electrically connected in series with the MR sensor. The control circuitry is structured, connected and/or programmed to turn on the gate of the first series-connected FET during operation of the MR sensor. The gate of the first series-connected FET is electrically connected to the source of the first series-connected FET. The second series-connected FET is adapted to be electrically connected in series with the MR sensor. The control circuitry is further structured, connected and/or programmed to turn on the gate of the second series-connected FET during operation of the MR sensor. The gate of the second series-connected FET is electrically connected to the drain of the second series-connected FET.

BRIEF DESCRIPTION OF THE DRAWINGS

FIG. 10 is a tenth graph showing information that is generated by and/or helpful in understanding embodiments of the present invention;

FIG. 11 is a first table showing information that is generated by and/or helpful in understanding embodiments of the present invention;

FIG. 15 is a second table showing information that is generated by and/or helpful in understanding embodiments of the present invention;

FIG. 16 is a third table showing information that is generated by and/or helpful in understanding embodiments of the present invention; and FIG. 17 is a fourth table showing information that is generated by and/or helpful in understanding embodiments of the present invention.

DETAILED DESCRIPTION

Figure 1A:
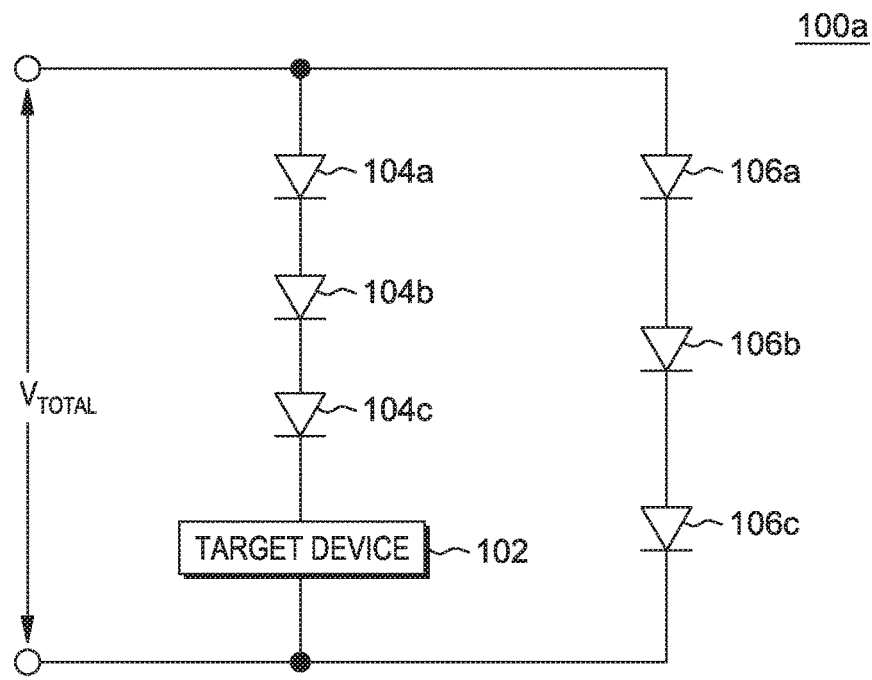
FIG. 1A is an electrical schematic view of a first embodiment of ESD protection circuitry according to the present invention.

Some embodiments of the present invention are directed to ESD protection circuitry that includes one, or more, of the following features, characteristics and/or advantages: (i) use of different "diode types" (see definition of "diode types," below, in the Definitions sub-section of this Detailed Description section) in a series-connected diode set and a parallel-connected diode set; (ii) a FET is connected in series with a target device such that the FET's gate can be turned on during normal operation and the FET's gate is resistively coupled to the FET's source; and/or (iii) two FETs are connected in series with a target device such that both FETs gates can be turned on during normal operation, one FET's gate is resistively coupled to its source, and the other FET's gate is resistively coupled to its drain. As used herein, the term "resistively coupled" shall be taken to mean the same thing as "electrically coupled."

Some embodiments of the present invention recognize one, or more, of the following potential problems with currently conventional ESD protection circuitry art: (i) in ESD protection devices that use PN diode(s) for protection from high current pulses, PN diodes only start shunting significant currents at voltage levels across the diode of about 1 V, which will not protect devices damaged at voltage levels below the turn on voltage of the PN diode; (ii) ESD protection devices that use Schottky diode(s) typically have poor high frequency performance due to their relatively high capacitance; (iii) in ESD protection devices that use only PN diodes, the turn-on voltage (also sometimes referred to herein as a "cut in voltage") tuning capabilities are typically limited, because it is difficult to significantly tune PN diodes through variations in doping levels; (iv) some ESD protection devices work well only for very specific values of the resistance of the electronic device being protected (RMR) and/or a narrow range of operating currents; and/or (v) it is difficult to tune currently conventional ESD protection devices to protect at 0.5 V and below while minimizing the signal losses due to current shunting through the impedance of the parallel path in the protection circuit.

Some embodiments of the present invention provide ESD (electrostatic discharge) protection circuitry that includes one or more of the following features and/or characteristics: (i) ESD protection circuitry including a target device, a set of series-connected diode(s), and a set of parallel connected diode(s); (ii) the series-connected diode(s) are connected in series with the target device; (iii) the parallel-connected diode(s) are connected in parallel with the target device and set of series-connected diode(s); (iv) at least one of the series-connected diode(s) is a different "diode type" than at least one of the parallel-connected diode(s); (v) all of the series-connected diode(s) are of a different "diode type" than any of the parallel-connected diode(s); and/or (vi) ESD protection circuitry having a wide range of needed I-V (current-voltage) characteristics.

As shown in FIG. 1A, ESD protected device 100a includes: target device 102; series-connected diode set 104 (including first series-connected diode 104a, second series-connected diode 104b and third series-connected diode 104c); and parallel-connected diode set 106 (including first parallel-connected diode 106a, second series-connected diode 106b and third parallel-connected diode 106c). Although this example shows three series-connected diodes in the series-connected diode set and three parallel-connected diodes in the parallel connected diode set, these sets: (i) could have more, or less, than three diodes within the respective sets; (ii) could have different numbers of diodes as between the respective diode sets; and/or (iii) could include additional circuit elements.

In device 100a: (i) series-connected diode set 104 uses diodes of a first "diode type;" and (ii) parallel-connected diode set 106 uses diodes of a second "diode type." More specifically: (i) diodes 104a, b and c are Schottky diodes; and (ii) diodes 106a, b and c are PN diodes. By using diodes of different diode types in the series and parallel branches of the ESD protection circuitry, the protection for the target device can be "tuned" for different operating current ranges and/or operating voltage ranges. In the embodiment of FIG. 1A, all of the series-connected diodes have a different diode type than any diode type present in the parallel-connected branch of the ESD protection circuitry.

In other embodiments, the series-connected branch may have one, or more, diode(s) of the same diode type as the diode(s) in the parallel connected branch, so long as there is at least one diode type present in either the series-connected branch, or the parallel-connected branch, which is not present in the other branch. Also: (i) diode set 104 may include more than one diode type; and/or (ii) diode set 106 may include more than one diode type. By combining diodes of different diode types in this way, it can become easier to achieve a desired set of I-V characteristics (such as an I-V curve, effective resistivity, Ohmic resistance, etc.). This can make it easier to precisely and/or accurately tune device 100a for different expected operating current ranges and/or expected operating voltage ranges. In device 100a, all diodes of diode set 104 have a different type than all diodes of diode set 106.

Some example I-V characteristics, which embodiments of the present invention can help accommodate and/or optimize will now be discussed. GMR and TMR sensors are built with a wide range of resistance values, depending on the application. GMR sensors used in extant tape drives have resistances of the order of 50 to 150 ohms and operate at currents of the order of 1 to 6 mA (milli-Amperes) and are used to read magnetic data written on magnetic media of the order of 1 Gbit/cm$^2$ (gigabit per centimeter squared). TMR sensors used in the same range may have resistances of the order of 20 to 100 ohms and operate below about 200 mV and are damaged by pulses in the nanosecond time range at about 1 V. TMR sensors used in extant hard disk drives (HDD) may have resistances on the order of 1000 ohms, are damaged by pulses in the nanosecond time range at between about 0.3 to 0.5 V and operate at voltages below or about 0.1 V and read data written on magnetic media at a density of the order of 50 Gbit/cm$^2$ or more.

Figure 1B:
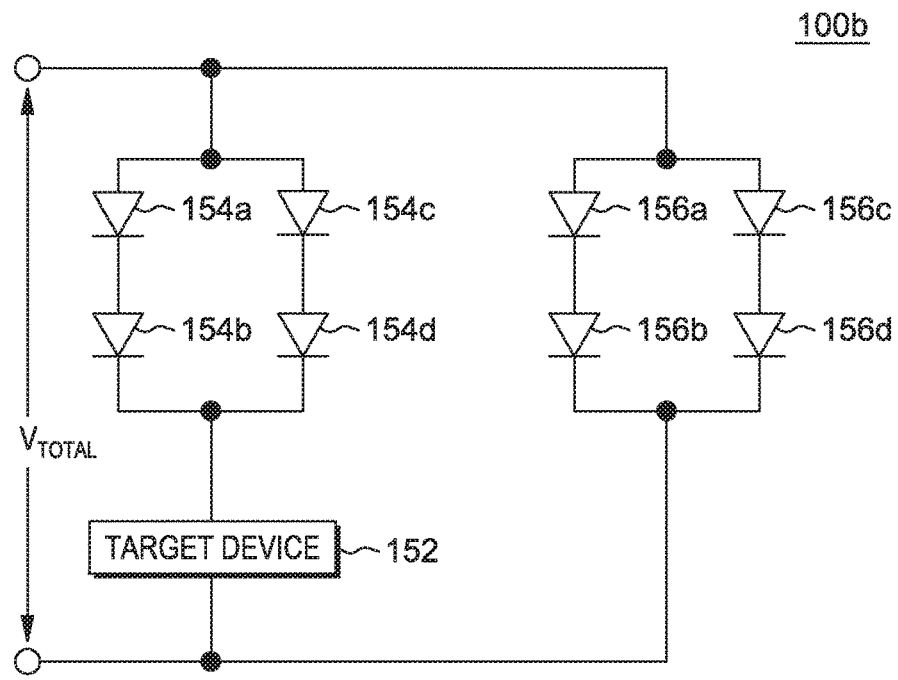
FIG. 1B is an electrical schematic view of a second embodiment of ESD protection circuitry according to the present invention.

As shown in FIG. 1B, ESD protected device 100b includes: target device 152; series-connected diode set 154 (including first series-connected diode 154a, second series-connected diode 154b, third series-connected diode 154c and fourth series-connected diode 154d); and parallel-connected diode set 156 (including first parallel-connected diode 156a, second series-connected diode 156b, third parallel-connected diode 156c, and fourth parallel-connected diode 156d). In device 100b, the diode sets themselves each have two parallel connected branches with two diodes each, oriented as shown in FIG. 1B.

In device 100b: (i) series-connected diode set 154 uses diodes of a first type; and (ii) parallel-connected diode set 156 uses diodes of a second type. More specifically: (i) diodes 154a, b, c and d are Schottky diodes; (ii) diodes 156a, d are also Schottky diodes; and (iii) diodes 156b, c are PN diodes. As with the embodiment of FIG. 1A, by using diodes of different types, the ESD protected device can be more easily tuned for different desired I-V performance characteristics. In this embodiment, both branches include Schottky diodes, but only the parallel-connected diode set (that is, 156a,b,c,d) includes diode(s) of the PN diode type. In this embodiment, both the series-connected diode set and the parallel-connected diode set respectively include diodes connected in parallel with each other.

As a variation on circuitry 100b of FIG. 1B: (i) a Schottky diode is used for diode 154a; (ii) PN diodes are used for diodes 154c and 156a; and (iii) omitting diodes 154b, 154d, 156b, 156c and 156d. In this way there is still a diode type (that is, the Schottky type) that is not common to the series-connected diode set and the parallel-connected diode set. This variation may be designed for (i) normal operation to turn on 154a with little current flow through 154c or 156a; and (ii) during the ESD event to shunt current through 156a. At the lower voltage range of the ESD event, more current passes through 154a than 154c, so the combination of 154a and 156a are performing the primary protection for the relatively low voltage portion(s) of an ESD event.

In circuitry 100b, there are four branches of diodes as follows: (i) first series-connected branch with diodes 154a, 154b; (ii) second series-connected branch with diodes 154c, d; (iii) first parallel-connected branch with diodes 156a,b; (iv) second parallel-connected branch with diodes 156c, d. As those of skill in the art will appreciate, in various protection designs for various target devices and various kinds of expected ESD events: (i) there could be additional series and/or parallel connected branches; (ii) one, or more, branches could be removed; (iii) one, or more, branches could have their diodes switched in polarity (for example, see the embodiment of FIG. 1E, which provides bi-direction protection due to reversal of polarity of certain diodes relative to the embodiment of FIG. 1B); (iv) there could be additional diode(s) on various branches present in a given design; and/or (v) there could be fewer diodes on various branches present in a given design. A complete discussion of different possible diode-branch architectures, and their various advantages and disadvantages, is beyond the scope of this document, but this information would be known by those of skill in the art.

Figure 1C:
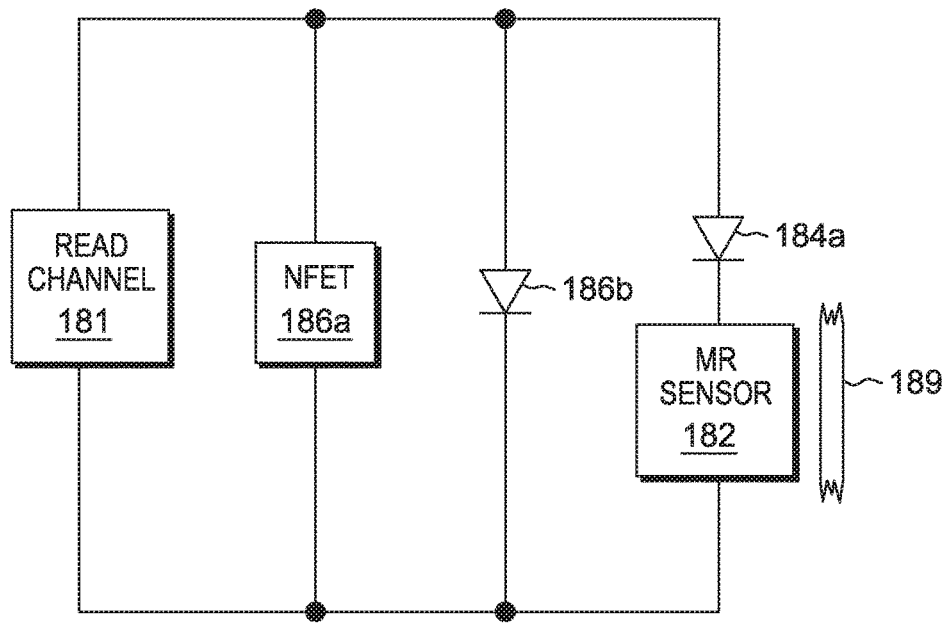
FIG. 1C is an electrical schematic view of a third embodiment of ESD protection circuitry according to the present invention.

As shown in FIG. 1C, ESD protected tape head circuitry 100c includes: read channel 181; MR sensor (also called target device) 182; series-connected PN diode 184a; parallel-connected DWNFET (also, more simply referred to as NFET) 186a; parallel-connected PN diode 186b; and tape medium 189. In this example, the parallel-connected diode set includes a diode type, specifically a DWFET type, which type is not present in the series-connected diode set. As mentioned above in the Background section, a DWNFET is any kind of FET that is structured and/or connected to act as a diode.

ESD protection circuitry 100d (see FIG. 1D) and ESD protection circuitry 100e (see FIG. 1E) will now be discussed in connection with the graphs of FIGS. 2A to 5B.

Figure 1D:
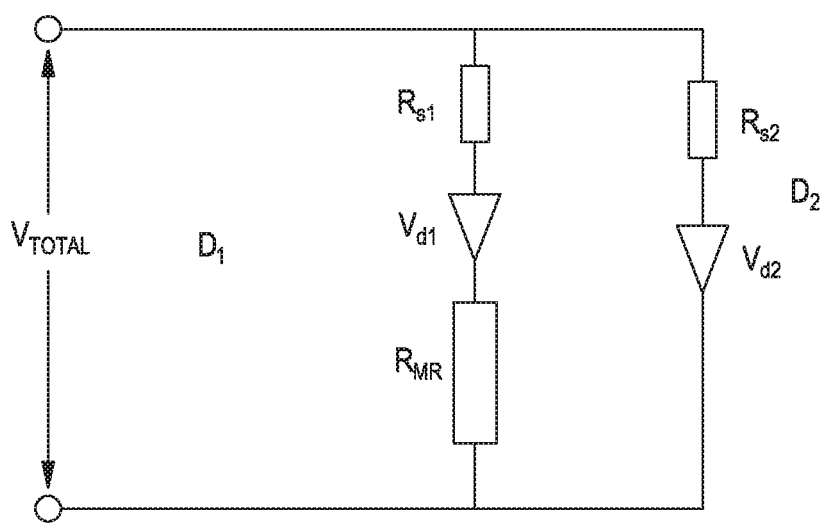
FIG. 1D is an electrical schematic view of a fourth embodiment of ESD protection circuitry according to the present invention.

As shown in FIG. 1D, ESD protection circuitry 100d includes: terminals with a potential difference $V_{TOTAL}$; series-connected branch D1; and parallel-connected branch D2. Series-connected branch D1 includes: target device $R_{MR}$; and series-connected diode set $R_{s1}$, $V_{d1}$. Parallel-connected branch D2 includes parallel-connected diode set $R_{s2}$, $V_{d2}$. With respect to series-connected branch D1, it should be understood that this branch may have one, or more, separate diode components, with: (i) the voltage drop across the diode component(s) being represented by $V_{d1}$; and (ii) the inherent resistance (also herein referred to as, effective resistivity) being represented by $R_{s1}$. With respect to parallel-connected branch D2, it should be understood that this branch may have one, or more, separate diode components, with: (i) the voltage drop across the diode component(s) being represented by $V_{d2}$; and (ii) the inherent resistance being represented by $R_{s2}$. For Schottky PN diodes and DWNFETs, the inherent resistance is usually a function of the device component's dimension (with larger diode components typically having lower resistance because of larger current-carrying area). As with previously-discussed ESD protection circuitry 100a, b, c, ESD protection circuitry 100d has at least one diode component of a type not common to the series-connected diode set and the parallel-connected diode set.

Figure 1E:
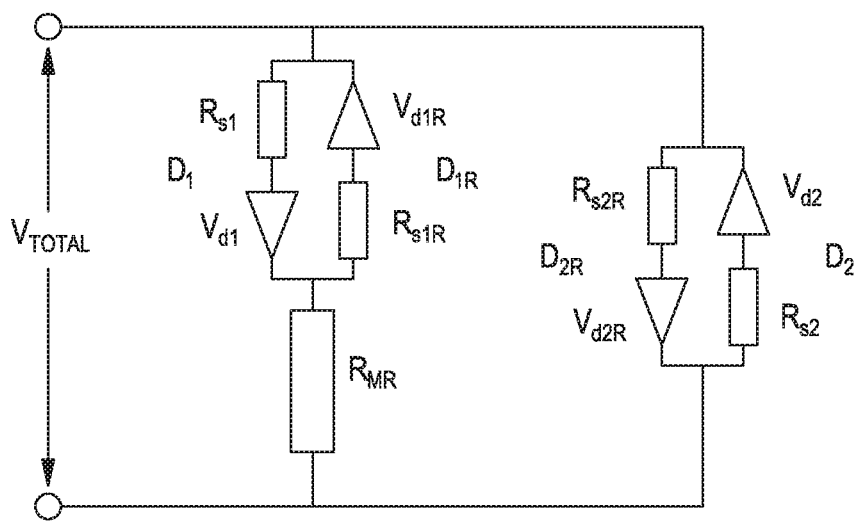
FIG. 1E is an electrical schematic view of a fifth embodiment of ESD protection circuitry according to the present invention.

As shown in FIG. 1E, ESD protection circuitry 100e includes: terminals with a potential difference $V_{TOTAL}$; series-connected branch D1 (including D1R providing series branch reverse protection); and parallel-connected branch D2 (including D2R providing parallel branch reverse protection). Series-connected branch D1 includes: target device $R_{MR}$; and series-connected diode set $R_{s1}$, $V_{d1}$, $R_{s1R}$, $V_{d1R}$. Parallel-connected branch D2 includes parallel-connected diode set $R_{s2}$, $V_{d2}$, $R_{s2R}$, $V_{d2R}$. As with the branches of ESD protection circuitry 100d, it should be understood that each branch/sub-branch D1, D1R, D2, D2R may include multiple, separate diode components, and the voltage drop and resistance blocks in FIG. 1E represent aggregate values for voltage drop and resistance on the branch/sub-branch. As with previously-discussed ESD protection circuitry 100a, b, c, d, ESD protection circuitry 100e has as least one diode component of a type not common to the series-connected diode set (that is the diodes of D1 including D1R) and the parallel-connected diode set (that is, the diodes of D2 including D2R).

To explain ESD protection circuitry 100d in more detail, ESD protection circuitry 100d includes: target device $R_{MR}$; series-connected diode with ideal diode voltage $V_{d1}$ with a series-connected resistor $R_{s1}$; parallel-connected diode with ideal diode voltage $Vd_2$ with its series-connected resistor $R_{s2}$ series-connected circuit branch D1; parallel-connected circuit branch D2; and voltage drop $V_{Total}$. To explain ESD protection circuitry 100e in more detail, ESD protection circuitry 100e includes: target device $R_{MR}$; first series-connected ideal diode with it's ideal diode voltage $V_{d1}$ and series-connected resistor $R_{s1}$; second series-connected diode with it's ideal diode voltage $V_{d1R}$ with second series-connected resistor $R_{s1R}$; first parallel-connected diode with it's ideal diode voltage $V_{d2}$ and series resistance $R_{s1R}$; second parallel-connected diode with it's ideal diode voltage $V_{d2R}$ and series resistance $R_{s1R}$; series-connected circuit branch D1; parallel-connected circuit branch D2; and voltage drop $V_{Total}$. Note that $V_{d1}$ and $V_{d2}$ and $V_{d1R}$ and $V_{d2R}$ represent the ideal diode and the resistors $R_{s1}$, $R_{s1R}$, $R_{s2}$, and $R_{s2R}$ are the inherent series resistance of the diodes and any connecting leads in series with the diode. Circuitry 100d protects only in one direction, while circuitry 100e protects in both directions. For many practical applications, circuitry 100e is more suitable than circuitry 100d because of the two-way protection of circuitry 100e.

In order to choose the desired semiconductor type and geometry, it is helpful to know the following inputs to the design process: (i) generalized "diode" equations from which to choose; (ii) capacitance versus diode area; (iii) the resistance of the target device ($R_{MR}$); (iv) the failure voltage ($V_{fail}$); and (v) the operating current/voltage of the target device.

In this example of choosing types for the ESD blocking devices for devices like circuitry 100d or circuitry 100e, the criteria for choosing D1 and D2 are: (i) minimize shunting currents by D2 in the operating current/voltage range so most or all of the current flows through D1-MR; (ii) minimize the capacitance of D2; and (iii) maximize the shunting current through D2 during ESD events. Criteria (i) and (ii) are used to optimize performance during operation, while criteria (iii) is to maximize the ESD protection of RMR. Criteria (i) is satisfied by decreasing the area of and increasing $V_{crit}$ for D2 and increasing the area and decreasing $V_{crit}$ for D1. Criteria (ii) is also achieved by decreasing the area of and increasing $V_{crit}$ for D2. Criteria (iii) is met by increasing the area and decreasing $V_{crit}$ for D2.

Though the criteria for operation (that is, criteria (i) and (ii)) and for protection (that is, criteria (iii)) are in opposition, an optimum does exist for matching both. In general, it is necessary to have Vd2>Vd1 for operation. To then achieve high shunting currents through $D_2$ during ESD events, the choice is to minimize $R_{s2}$. Because $R_{MR}\gg\{R_{s1}, R_{s2}\}$, the series resistance for $D_1$-$R_{MR}$ is dominated by $R_{MR}$, so making the area high for $D_1$ has little effect on $R_{s1}+R_{MR}$. Utilizing the combination of different types of diodes for $D_1$ and $D_2$, there is a large selection of $V_{crit}$ and $R_{on}$ for both $D_1$ and $D_2$.

Further, in order to analyze the different options, it is best to have an analytical expression for the options for $D_1$ and $D_2$.

The data is fit with an analytical Expressions 1a to 1e as follows:

$$I_{diode}=W_d*J_o(T)*[\exp(q*e*V_d/K_BT)-1] \quad \text{(Expression 1a)}$$

$$\text{with } J_o(T)=J_{do}*\exp(-eV_o/K_BT), \quad \text{(Expression 1b)}$$

$$\text{and } V_{diode}=I_{diode}*R_s. \quad \text{(Expression 1c)}$$

$$\text{for PN and DWFETs}, R_s=R_{so}+dR_s/W_d \quad \text{(Expression 1d)}$$

$$\text{and for Schottky diodes}, R_s=R_{so}+dR_s/[L_d*W_d] \quad \text{(Expression 1e)}$$

where $L_d*W_d$ is the area of the Schottky diode and $W_d$ is the perimeter of the PN or DWFET. Note that for a Schottky diode, Expression 1a uses a fixed $L_d$, but allows a variation in $W_d$ in the design.

With respect to Expressions 1a to 1e above: (i) $I_{diode}$ is the current through the diode; (ii) $V_{diode}$ is the voltage across the diode; (iii) $W_d$ is the perimeter of the diode; (iv) $W_d$ is the width of the anode for a Schottky diode; (v) T is the temperature in K (Kelvin); (vi) $K_B$ is Boltzmann's constant; (vii) e is the electron charge; and (viii) $V_d$ is the voltage across the ideal portion of the diode (prior to the on resistance, $R_s$). $R_s$ has two components: (i) a fixed resistance, $R_{so}$; and (ii) a portion ($dR_s$) which is inversely proportional to $W_d$ (and $W_d*L_d$ for Schottky diodes). As discussed earlier, the second dimension for the current carrying area of a PN or DWFET is related to the depth of the trench, but is not easily determined while $W_d$ is easily defined by the geometry of the design. For the Schottky diodes, the diode effect is a physical property of the interface between two metals and the area is easily defined by the product of the perimeter $W_d$ and the width $L_d$ of the Schottky diode. The diodes have several parameters which depend on the diode type and the doping levels: (i) the voltage $V_o$; (ii) the charge q; and (iii) the current density $J_{do}$. For DWNFETs, $V_o$ depends on the voltage on the body of the semiconductor, $V_o$, which is given by Expression (2a), below. The temperature dependence of the parameters is given in Expression (2b) below.

$$\text{and } V_o=V_{sat}+(V_{do}-V_{sat})*\exp(V_b/V_{bo}) \quad \text{(Expression 2a)}$$

$$\text{and } V_{bo}=V_{ba}+dV_b*[T-298 \text{ K}]. \quad \text{(Expression 2b)}$$

As shown, FIGS. 2A through 5B show the current versus voltage (IV) curves for PN, Schottky, and DWNFETs. These figures show data for specific PN, Schottky and DWFETs and are used to determine the diode fitting parameters using Expressions (1a) through (1e), and Expressions (2a) and (2b), noted in the paragraphs above, to fit the measured IV (current voltage) curves. FIGS. 2A through 5B will now be discussed in further detail.

Figure 2A:
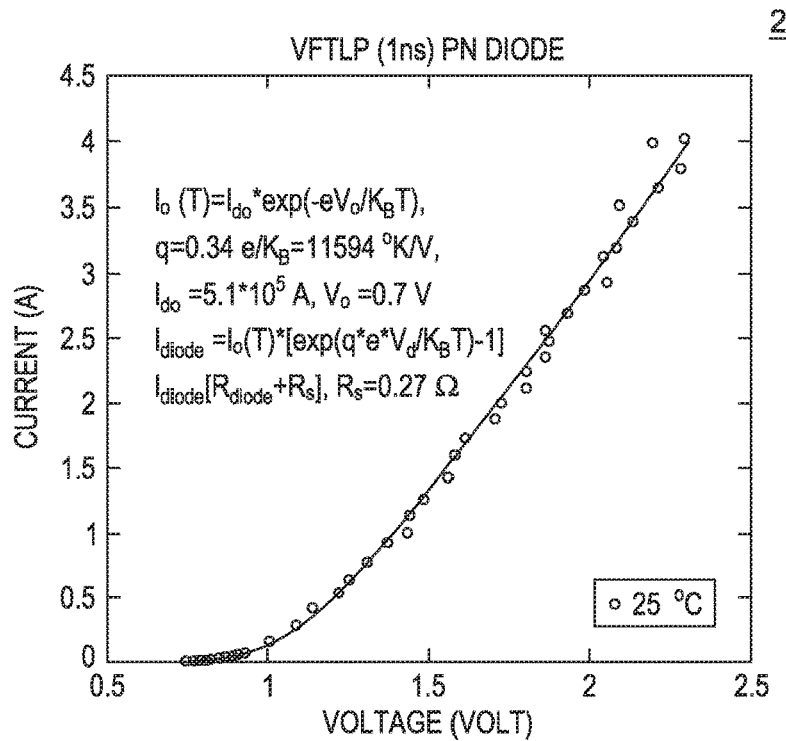
FIG. 2A is a first graph showing information that is generated by and/or helpful in understanding embodiments of the present invention.

As shown in FIG. 2A, graph 200a shows the current versus voltage curve for a PN diode where: (i) the current range is between 0.5 A (amp) and 4.5 A (amps); and (ii) the voltage range is between 0.5V (volt) and 2.5V (volts). This graph shows the IV curves generated with 1 ns (nanosecond) voltage pulses using a very fast transmission line pulse tester (VFTLP) for a PN diode with a perimeter of 0.72 mm (millimeters). The parts were mounted in a fixture maintained at a temperature of 25° C. (Celsius).

Figure 2B:
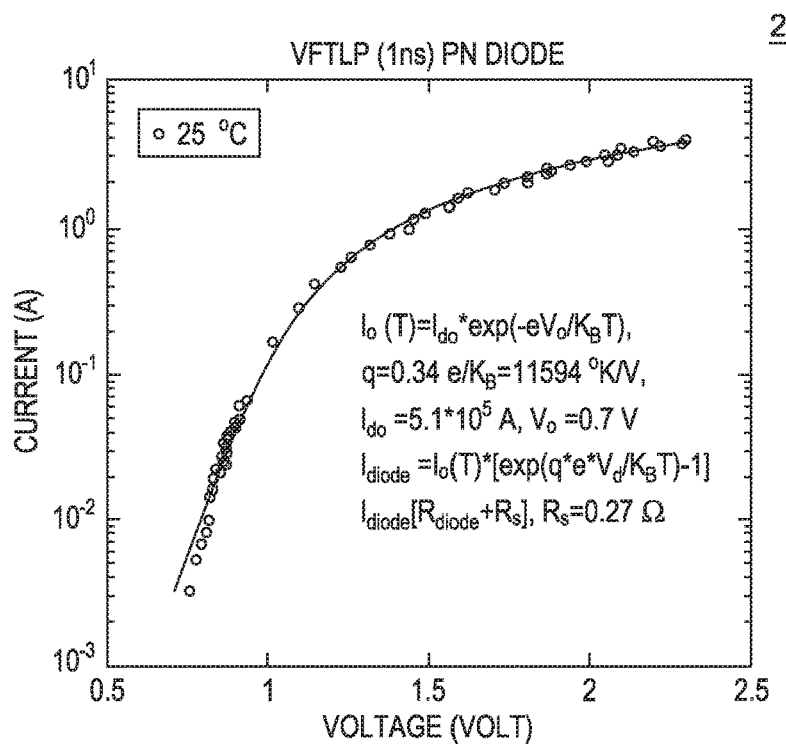
FIG. 2B is a second graph showing information that is generated by and/or helpful in understanding embodiments of the present invention.

As shown in FIG. 2B, graph 200b shows the current versus voltage curve for a PN diode where: (i) the current range is between $10^{-3}$ A and $10^{1}$ A; and (ii) the voltage range is between 0.5V and 2.5V. This graph shows the 1 ns VFTLP IV curve for a PN (p-type, n-type) diode with a perimeter of 0.72 mm (millimeters) at 25° C. (Celsius).

Figure 3A:
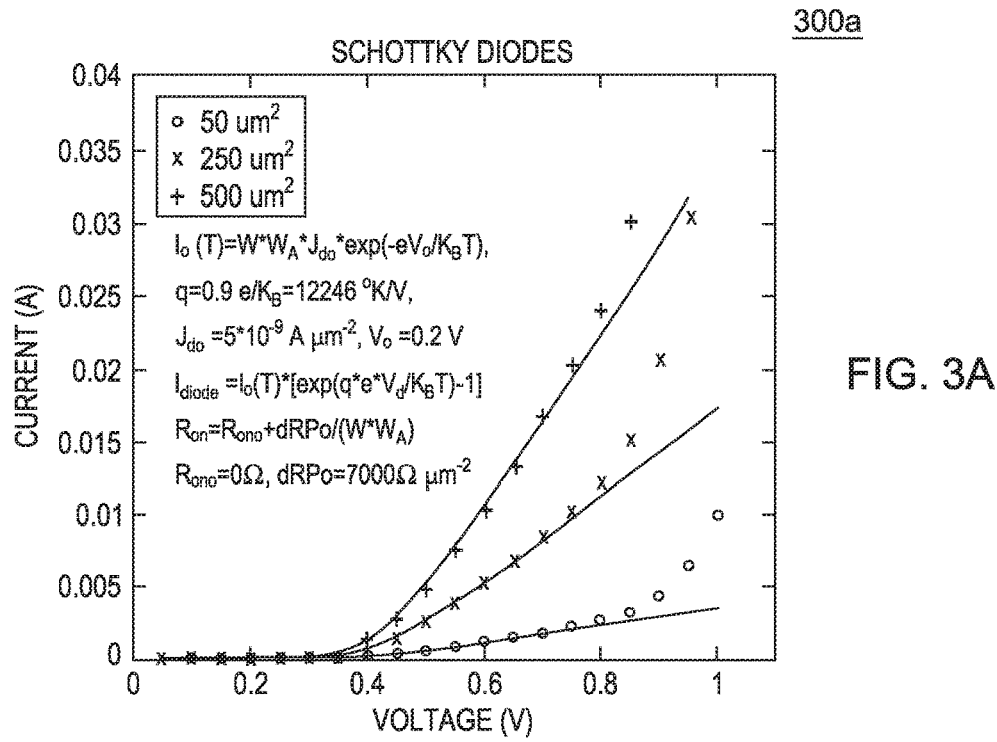
FIG. 3A is a third graph showing information that is generated by and/or helpful in understanding embodiments of the present invention.

As shown in FIG. 3A, graph 300a shows the current versus voltage curves for a Schottky diode where: (i) the current range is between 0.005 A and 0.04 A; and (ii) the voltage range is 0V and 1V. This graph shows Schottky diode linear current versus voltage curves. The increase in current for the data versus the fit beyond about 0.8V is due to a parallel PN diode path.

Figure 3B:
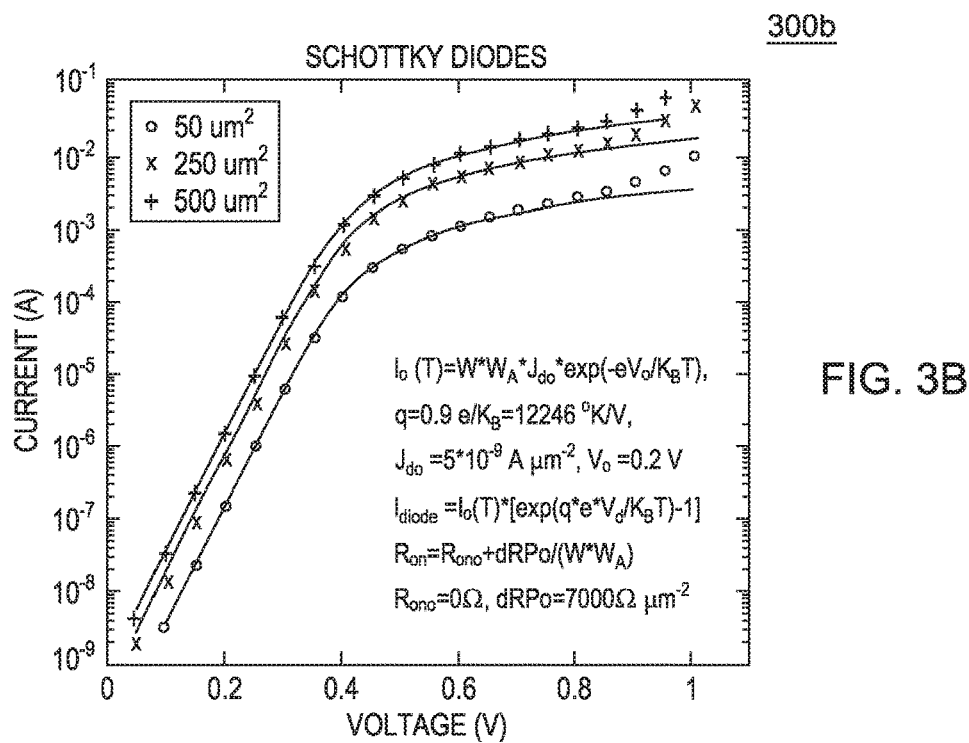
FIG. 3B is a fourth graph showing information that is generated by and/or helpful in understanding embodiments of the present invention.

As shown in FIG. 3B, graph 300b shows the current versus voltage curves for a Schottky diode where: (i) the current range is between $10^{-9}$ A and $10^{-1}$ A; and (ii) the voltage range is between 0V and 1V. This graph shows Schottky diode logarithmic current curves versus voltage. The increase in current for the data versus the fit beyond about 0.8V is due to a parallel PN diode path.

Further, FIGS. 3A and 3B, graphs 300a and 300b respectively, show IV curves for Schottky diodes with different areas. The increase in current for the data versus the fit beyond about 0.8V is due to a parallel PN diode path and is not analyzed.

Figure 4A:
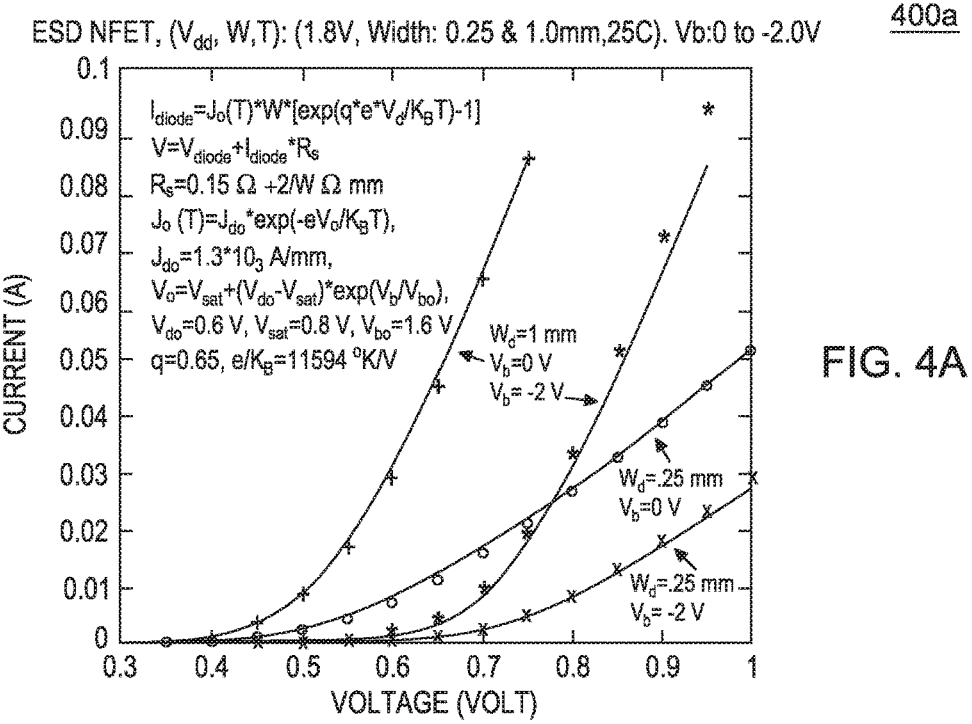
FIG. 4A is a fifth graph showing information that is generated by and/or helpful in understanding embodiments of the present invention.

As shown in FIG. 4A, graph 400a shows current versus voltage curves for a DWNFET (diode connected n-type field effect transistor) (NFET (n-type field effect transistor)) where: (i) the current range is between 0.01 A and 0.1 A; and (ii) the voltage range is between 0.3V and 0.9V. This graph shows linear current versus voltage curves for DWFETs with a width of 0.25 mm and 1 mm and body voltages ($V_b$) of 0V and −2V relative to the drain of the DWFET.

Figure 4B:
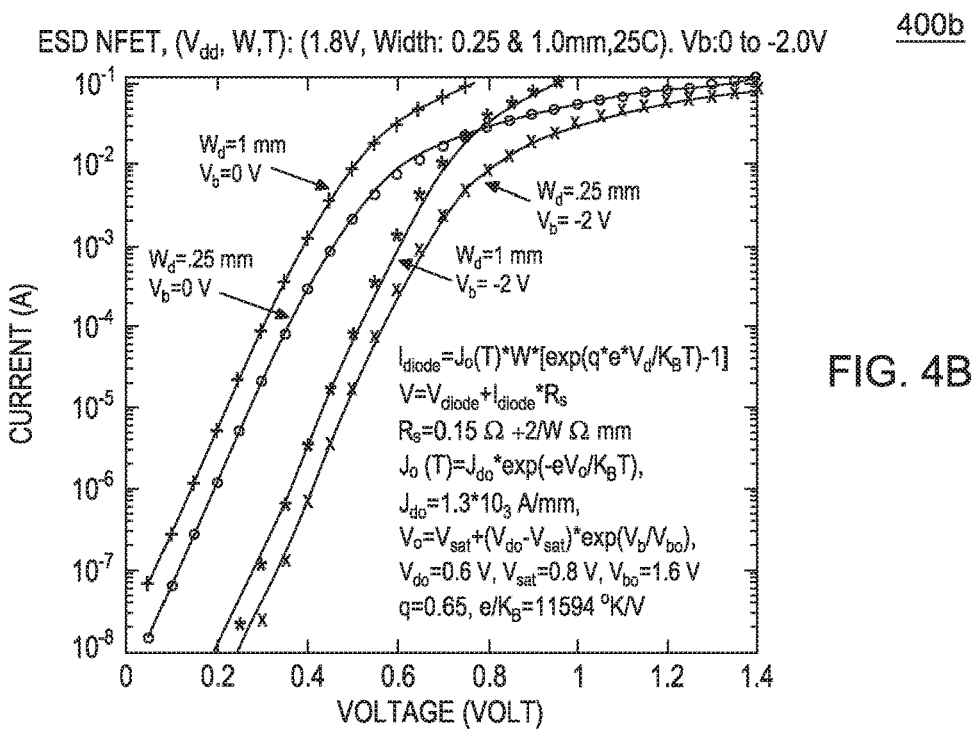
FIG. 4B is a sixth graph showing information that is generated by and/or helpful in understanding embodiments of the present invention.

As shown in FIG. 4B, graph 400b shows current versus voltage curves for a DWNFET (NFET) where: (i) the current range is between $10^{-8}$ A and $10^{-1}$ A; and (ii) the voltage range is between 0V and 1.4V. This graph shows logarithmic current versus voltage curves for DWFETs with a width of 0.25 mm and 1 mm and body voltages ($V_b$) of 0V and −2V relative to the drain of the DWFET.

Further, FIGS. 4A and 4B, graphs 400a and 400b respectively, show the DC (direct current) IV curves for DWNFETs with a width of 0.25 mm and 1 mm and body voltages ($V_b$) of 0V and −2V relative to the drain of the DWFET.

Figure 5A:
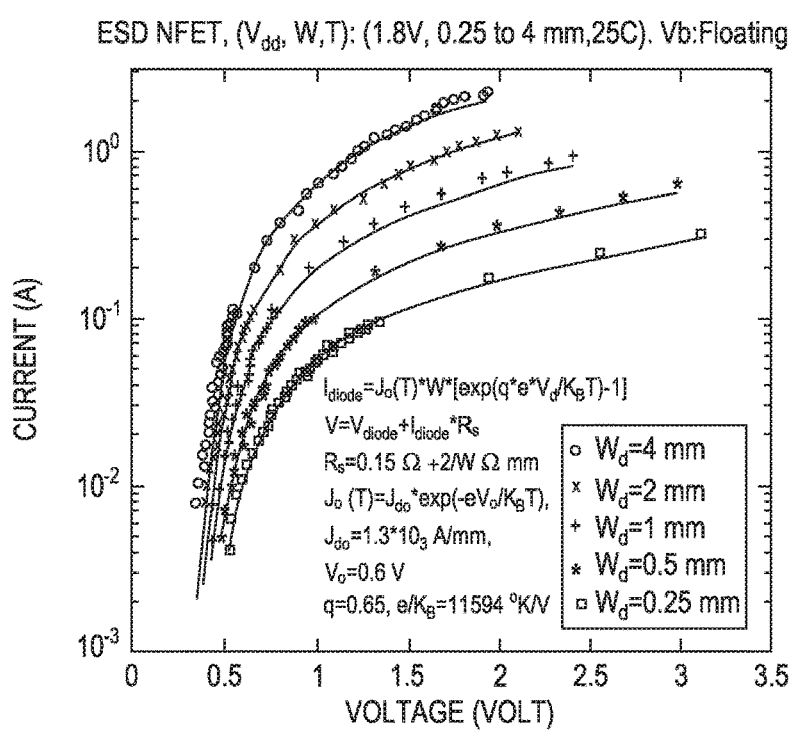
FIG. 5A is a seventh graph showing information that is generated by and/or helpful in understanding embodiments of the present invention.

As shown in FIG. 5A, graph 500a shows current versus total voltage curves for a DWNFET (NFET) where: (i) the current range is between $10^{-3}$ A and above $10^{0}$ A; and (ii) the voltage range is between 0V and 3.5V. This graph shows 1 ns VFTLP data for NFETs with widths of 0.25 mm and 1 mm and body floating.

Figure 5B:
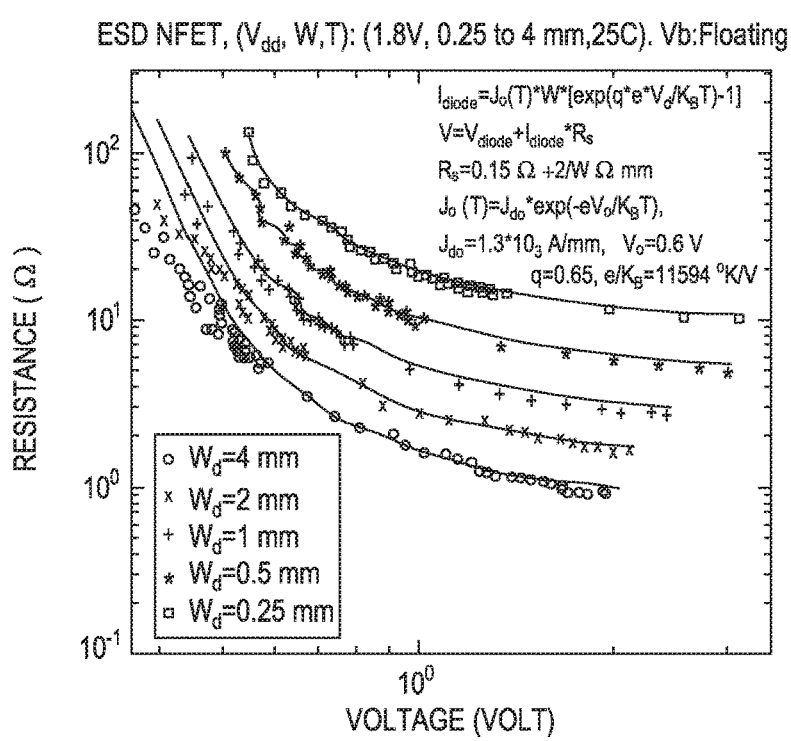
FIG. 5B is an eighth graph showing information that is generated by and/or helpful in understanding embodiments of the present invention.

As shown in FIG. 5B, graph 500b shows resistance versus total voltage curves for a DWNFET (NFET) where: (i) the resistance range is between $10^{-1}\Omega$ (ohms) and above $10^{2}\Omega$ (ohms); and (ii) the voltage range is steady at $10^{0}$ V. This graph shows 1 ns VFTLP data for NFETs with widths of 0.25 mm and 1 mm and body floating.

Further, FIGS. 5A and 5B, graphs 500a and 500b respectively, show the IV (current voltage) and RV (resistance voltage) data curves respectively, for 1 ns VFTLP data for NFETs with widths of 0.25 mm, 0.5 mm, 1 mm, 2 mm, and 4 mm and the body of the NFET floating. $V_b$ is the FET body voltage. The data in the figures are fit using equations 3a and 3b, noted in the paragraphs above, for the PN and Schottky diodes and including equations 4 for the DWNFETs. The parameters used in the fits are given in Table 1 and Table 2 shown below. Table 1 shows the diode parameters for the 1 ns VFTLP data. This data also fits the DC IV curve data for the diodes. Table 2 gives the parameters to fit the IV curves for DWNFETs at DC currents. Tables 1 and 2 will be discussed in further detail below.

The ease of tuning the circuit ESD protection circuitry 100d (see FIG. 1D) by mixing diodes of different physical types is easily apparent by glancing at the IV curves. As an example, the DWNFET diode of FIG. 4B with a perimeter ($W_d$) of 1 mm passes a current of 1 mA when a voltage of about 0.4 V is applied to it when Vb=0V. The PN diode shown in FIG. 2B, on the other hand does not pass 1 mA until a voltage of about 0.7 V is applied across it, or a differential of 0.3 V. Thus, using the DWNFET with a $V_{dd}$ of 1.8V and a perimeter of 1 mm in series with a target device having a resistance of 50 ohm and operating at 1 mA will result in the DWNFET being turned on and a voltage of 0.450 V will be across the PN diode in the location of D2. At a voltage of 0.45 V<<1 mA will pass through the PN diode in location D2, so the presence of D2 will in essence not affect the performance of the device by shunting current away from $R_{MR}$. If the 50 ohm target device is damaged at 1 V, 20 mA will need to pass through it. Take the example of 1 V across D2. In order to generate 1 V across the PN the diode would require 150 mA, which is substantially higher than the 20 mA. Still, without D1 the 1 V would damage the MR. 1 V across the series connection of D1 and $R_{MR}$ results in about 0.5 V across D1 and 0.5 V across $R_{MR}$ with a current of 10 mA, far less than is needed to damage the sensor. Note also that the effective resistance of the circuit would be about 6.3 ohm. In this example the 1 V would have damaged the MR in the absence of D1. Attempting to achieve these results with PN diodes for both D1 and D2 is much more difficult to achieve. Further analysis will be given later.

Another important parameter is the capacitance of the diode as shown in Table 3 below. The capacitance, C, and impedance, Z, for the devices is given by Expressions (3a) and (3b) below:

$$C = C_{oj} + \Delta C_{wj} W_{dj}, \quad \text{(Expression 3a)}$$

$$Z = 1/[2\pi f C] = 1/[2\pi f [C_o + \Sigma_j [\Delta C_{wj} W_{dj}]]]. \quad \text{(Expression 3b)}$$

where $C_{oj}$ and $\Delta C_{wj}$ are the capacitance parameters for all j elements which are in parallel with one another, and f is the frequency and $W_{dj}$ is the perimeter of the device. While for the case of DWFET and PN diodes, $W_{dj}$ is the appropriate parameter, for a Schottky diode, $W_{dj}$ should be replaced by the area of the Schottky diode, which is the width times the length of the anode ($L_d$). Often a designer will merely fix $L_d$ and vary the width, so Expression 3a is still relevant. In general, $C_{oj}$ is associated with lead effects while $\Delta C_{wj}$ is the intrinsic capacitance of the diode, and thus is proportional to the area. For multiple elements connected in parallel, a single value of $C_o$ is used, and is the capacitance for the pads used for attaching the diode circuits to the external electronics. The $\Sigma_j$ in Expression (3b) is the summations operation for all diodes connected in parallel. Note that the diodes in the reverse current polarity can be different from those in the forward polarity. In fact, for the reverse polarity, one might choose to have the diodes for the reverse polarity, $D1_R$ and $D2_R$, being identical PN diodes. Tables 3 will be discussed in further detail below.

In the design considerations, the capacitance of D1 is of little importance since the desire is to pass current through D1. However, the capacitance of D2 should be chosen to be low enough so as to not shunt too much current during operation. Table 4 (shown in FIG. 16, especially at column labelled Icshunt which gives a proportion of shunted current) gives various designs and the effective capacitance of the devices.

Table 1 below shows the 1 ns (nanosecond) IV (current voltage) parameters for NFET (n-type field effect transistor) and PN (p-type, n-type) diodes.

TABLE 1

1 ns IV parameters for NFET and PN diodes using Expressions 1a-e.

| Type-polarity* | $V_o$ V | $J_{do}$ A/mm | q | $R_{so}$ Ω | $dR_s$ Ω/mm |
|---|---|---|---|---|---|
| NFET1.8V-R | 0.75 | 7.0E9 | 0.35 | 0.25 | 1.3 |
| NFET1.8V-F | 0.61 | 3.0E3 | 0.65 | 0.4 | 1.8 |
| NFET2.5V-F | 0.72 | 3.0E3 | 0.65 | 0.4 | 4.6 |
| NFET3.3V-F | 0.75 | 3.0E3 | 0.65 | 0.4 | 6.6 |
| PN | 0.65 | 2.2E6 | 0.26 | 0.19 | 0.09 |
| Schottky | 0.60 | 4.0E2 | 0.95 | 0 | 1.4+ |

*F: Forward and R: Reverse bias
+Ld = 5 μm (micrometers)

Table 2 below shows the DC (direct current) diode parameters for various NFET (n-type field effect transistor) configurations.

TABLE 2

DC diode parameters for various NFET configurations using Expressions 1a-e and 3a at the temperature given.

| $V_{dd}$ V | T °C. | q | $J_{do}$ A/mm | $V_{do}$ V | $V_{sat}$ V | $V_{bo}$ V |
|---|---|---|---|---|---|---|
| 1.8 | 25 | 0.70 | 2.6E3 | 0.64 | 0.91 | 1.6 |
| 5.0 | 25 | 0.57 | 17 | 0.56 | 0.91 | 1.8 |
| 1.8 | 125 | 0.70 | 1.3E3 | 0.70 | 0.95 | 1.6 |

Table 3 below shows the capacitance values for PN (p-type, n-type), Schottky and DWNFET (diode connected n-type field effect transistors) diodes.

TABLE 3

Capacitance values for PN, Schottky and DWNFET diodes.

| Type | PN | Schottky+ | DWNFET |
|---|---|---|---|
| $C_o$ (pF) | 0.03 | 0.03 | .03 |
| $\Delta C_W$ (pF/mm) | 0.5 | 6.8 | 1.0 |

+Ld = 5 μm (micrometers)

Figure 6:
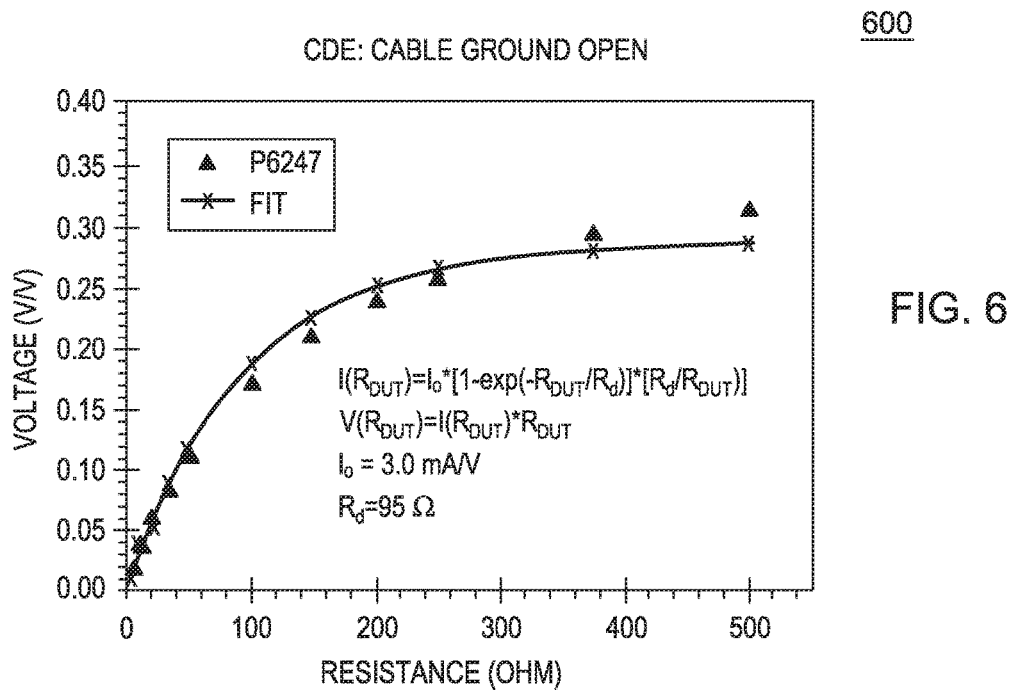
FIG. 6 is a ninth graph showing information that is generated by and/or helpful in understanding embodiments of the present invention.

As shown in FIG. 6, graph 600 is a plot of the ratio of the voltage across a resistor ($R_{dut}$) at the end of the cable ($V_{dut}$) to cable voltage ($V_{cable}$) versus $R_{dut}$. Cable discharge events (CDEs) can occur with MR sensors. Most MR sensors are connected to a flexible cable during the manufacturing process. The cabled device is sensitive to ESD damage. A CDE can occur when the cabled MR element is charged and then one lead of the cable is discharged through a metal contact. The data is fit using the following Expressions 4a and 4b:

$$V_{dut} = I_{dut} * R_{dut},$$ (Expression 4a)

$$I_{dut} = V_{cable} * \Delta I_o * [1 - \exp(-R_{dut}/R_d)] * [R_d/R_{dut}]$$ (Expression 4b)

Further as shown in FIG. 6, graph 600 shows the ratio of voltage $V_{dut}/V_{cable}$ versus $R_{dut}$ for a cable about 15 cm (centimeters) long with leads about 0.2 mm wide for a CDE experimental event where one lead is charged to a voltage $V_{cable}$ and then discharged through a 10Ω resistor to ground. The current through $R_{dut}$ is measured and $V_{dut}$ is calculated using Ohm's law.

Tables 4 and 5 respectively shown in FIGS. 16 and 17 below, may be used by a circuit designer to analyze different values for $D_1$ and $D_2$ to protect a MR sensor circuit according to some embodiments of the present invention. These tables will now be discussed in further detail.

As shown in Table 4 of FIG. 16, the table data shows the results of calculations for DC (direct current) and pulsed data to damage a 41Ω MR resistor ($R_{MR}$) with a failure voltage across the resistor of $V_{MR-FAIL}$ of 0.85V. The desired operating current range is from 1 mA (milliamps) to 6 mA through the MR. $I_{ds}$ is the shunting current through the diode when the current $I_{mr}$ is passing through the MR during normal operation. Shunting current through the parallel diode ($I_{ds}$) degrades performance. $V_{cable}$ is the voltage on a particular cable which results in a voltage $V_{MR-FAIL}$ across a resistance $R_{dut}$ at the end of the cable. The higher $V_{cable}$ voltage, the better the ESD protection. Although using a PN diode for both $D_1$ and $D_2$ offers essentially twice the ESD protection versus using an NFET for $D_1$ and a PN diode for $D_2$, the former severely limits the current range for the 41Ω MR element to below approximately 2 mA. For this analysis, the value of $R_{MR}$ is taken to be independent of current or voltage. The rows are ordered in increasing protection (highest value for $V_{Cable}$). While the final design of using PNs with different perimeters has the highest value of 356 V, it shunt significant current. For a TMR sensor used in a Tape drive and operating even up to a 1 GHz data rate for a single channel, and a current range of 1 to 4 mA, for design #5 in Table 4 of FIG. 16 with a 4 mm wide NFET for D1 and a 0.2 mm wide PN for D2 is optimum, shunting <<1 mA at any of the operating points through D1 due to the IV characteristics of the devices and the capacitive impedance of 12.1 k ohm versus the 41 ohm RMR shunts very little (1.4%) capacitive current at a 1 GHz. Design #6 in Table 4 (see FIG. 16) using a 1 mm wide PN for D1 and a 0.05 mm wide PN for D2 has the highest protection level (42 times the unprotected value) but it begins to shunt current at 2 mA through the 41Ω MR sensor of 0.3 mA, or 15%, at 4 mA, 6 mA is shunted through D2, which is 50% more than the current through the MR sensor. Thus, Design #5 offers both excellent protection with no leakage current even at 0.1 mA up to 6 mA through the MR sensor.

As shown in Table 5 (of FIG. 17): (i) column heading D1 refers to the series-connected diode type (or "X" for no series-connected diode); (ii) the W columns refer to physical dimension that is related to the effective resistance of the diode; (iii) column heading D2 refers to the parallel-connected diode type (or "X" for no parallel-connected diode); (iv) $C_p$ column refers to the capacitance of the parallel-connected diode; (v) Z column refers to the effective impedance of the parallel-connected diode at 1 gigahertz (GHz); (vi) $I_{cshunt}$ column refers to a proportion of capacitive current shunted during normal operations; (vii) the $R_{dut}$ columns refer to resistance of the target device; (viii) $V_{cable}$ column refers to a cable discharge voltage (as will be understood by those of skill in the art); (ix) the $I_{mr}$ row refers to the amount of current used as a basis for the measurements in the four (4) rightmost columns of the table; and (x) the $I_{ds}$ columns refer to the current running through the parallel-connected diode (if any).

It is noted that not all rows of the table of FIG. 17 have different "diode types" for their series-connected and parallel-connected diodes (and indeed some rows do not even have a series-connected or parallel-connected diode at all).

As will be appreciated by those of skill in the art, the data of the table of FIG. 17 is the type of data that can be used to choose and optimize what diode types to use in order to achieve various performance characteristics (for example, turn on voltage for the series-connected diode(s) set, turn on voltage for the parallel-connected diode(s) set, proportion of current shunted through the parallel-connected diode(s) set during normal operations, etc.) for various embodiments of the present invention.

In FIG. 17, the table data shows the results of calculations for DC (direct current) and pulsed data to damage a 500Ω MR resistor ($R_{MR}$) with a failure voltage across the resistor of $V_{MR-FAIL}$ of 0.5V. The desired operating range is up to about 100 mV (millivolts) across the sensor, so the current is approximately 200 µA. $I_{ds}$ is the shunting current through the diode D2 when the current $I_{mr}$ is passing through the MR during normal operation. The desire is to have $I_{ds}/I_{mr}$ as low as possible. $V_{cable}$ is the voltage on a particular cable which results in a voltage $V_{MR-FAIL}$ across a resistance $R_{dut}$ at the end of the cable. The higher $V_{cable}$, the better the ESD protection. Efficient operation is achieved the closer $R_{eff}$ is to $R_{MR}$, and the higher the ratio of Z (impedance) to $R_{MR}$. For this analysis, the value of $R_{MR}$ is taken to be independent of current or voltage. The design parameters shown in the last row of FIG. 6, table 600, are for reverse bias only, since in operation, the current shunted through $D_2$ is equal to or greater than the current shunted through $D_1$. This design has higher ESD protection than the forward design (where W (width)=4 mm (millimeters)). The capacitance for $D_{2R}$ and $D_2$ is equal and W (width)=0.2 mm. Designs 7, 8 and 10 are three of the best designs, having relatively low $I_{shunt}$ and improved protection of 3.6, 2.5 and 4.3 times the unprotected cable voltage damage levels. While design 8 has the lowest protection of these three options, it affects the performance the least: at the 200 µA operating current, shunting only 33% of the current through the capacitance of D2 versus the next best option 7 of 42%, and 76% for the parallel NFET design (option 4) which has equivalent protection. Thus, superior protection is achieved through the series-parallel design of option 8 versus the simple parallel design of option 4.

In some embodiments of the present invention, a target device is connected to a first series-connected ESD blocking device, a first series-connected resistive element, and a first parallel-connected ESD blocking device. The first series-connected ESD blocking device is one of the following types: PN, a Schottky (SD), or a diode connected FET (DWFET). The first parallel-connected ESD blocking device is one of the following types: a PN, a Schottky (SD) or a diode connected FET (DWFET). The first parallel-connected ESD blocking device has different IV characteristics than the first series-connected diode. The first series-connected ESD blocking device and the first parallel-connected ESD blocking devices are structured so that: (i) the first series-connected ESD blocking device and first series-connected resistive element pass more current than the first parallel-connected ESD blocking device for operating currents; and (ii) the first series-connected ESD blocking device and first series-connected resistive element pass less current than the first parallel-connected ESD blocking device at relatively high currents associated with ESD events.

Some embodiments of the present invention as described in the previous paragraph may further include one, or more, of the following features, characteristics and/or advantages: (i) both the first series-connected ESD blocking device and the first parallel-connected ESD blocking device are PN diodes such that the first series-connected PN diode has a larger perimeter than the first parallel-connected PN diode; (ii) the first parallel connected ESD blocking device is a PN diode and the first series-connected ESD blocking device is one of the following types: a DWNFET or a DWPFET; (iv) the first series-connected ESD blocking device is a Schottky diode and the first parallel-connected ESD blocking device is a PN diode; (v) the first series-connected ESD blocking device is a DWFET (that is DWNFET or DWPFET) and the first parallel-connected ESD blocking device is a PN diode; (vi) the first series-connected ESD blocking device is a DWFET and the first parallel-connected ESD blocking device is a DWFET, and the Vdd voltage for the first series-connected DWFET is less than the Vdd for the first parallel-connected DWFET; and/or (vii) the first series-connected ESD blocking device is a DWFET and the first parallel-connected ESD blocking device is a DWFET, and first series-connected DWFET and the first parallel-connected DWFET have different perimeters.

Some embodiments of the present invention as described two paragraphs previous may further include a second series-connected ESD blocking device and a second parallel-connected ESD blocking device. The second series-connected ESD blocking device is connected in parallel with the first series-connected ESD blocking device and, the first and second ESD blocking devices are connected to have opposing polarities. The second parallel-connected ESD blocking device is connected in parallel with the first parallel-connected ESD blocking device, and the first and second ESD blocking devices are connected to have opposing polarities.

Some embodiments of the present invention as described in the previous paragraph may further include one, or more, of the following features, characteristics and/or advantages: (i) the second series-connected ESD blocking device and the second parallel-connected ESD blocking device respectively have different types than the first series-connected ESD blocking device and the first parallel-connected ESD blocking device; (ii) the second series-connected blocking device and the second parallel-connected blocking device respectively have as equal, or greater, ESD protection than do the first series-connected ESD blocking device and the first parallel-connected ESD blocking device; (iii) the second series-connected blocking device and the second parallel-connected blocking device are structured to keep an added capacitance across the parallel connected branch of the ESD protection circuitry relatively low; and/or (iv) the second series-connected ESD blocking device and the second parallel-connected ESD blocking device have the same type and the same characteristics.

In general, the designer must choose between tradeoffs which favor protection versus operation of the MR device. The device must function, so the designer must make choices which allow good performance, if not optimum performance. Since ESD events often completely damage or severely impact performance and are costly losses, some choices are made to greatly improve (factor of 2 or more in failure levels can have significant yield impacts) while relinquishing some of the performance. For optimum operation, the designer should aim to lower shunting currents through D2, either via capacitive currents (Equations 5a-b) or simple DC current paths. Improved operation is also achieved with lower effective resistance of the device by lowering the Johnsson-Nyquist (or thermal) noise (lower $R_{eff}$ in Tables 4 and 5). Better protection is reflected in higher cable failure voltages ($V_{Cable}$).

Some embodiments of the present invention, as described four paragraphs previous, may further include a second parallel-connected ESD blocking device. The second parallel-connected ESD blocking device is connected in parallel with the first parallel-connected ESD blocking device. These embodiments may further include one, or more, of the following features, characteristics and/or advantages: (i) the first and second parallel-connected ESD blocking devices are of two different types; (ii) the first and second parallel-connected ESD blocking devices are structured so that: (a) the first parallel-connected ESD blocking device turns on more quickly during an ESD event than the second parallel-connected ESD blocking device, and (b) the second parallel-connected ESD blocking device shunts more current under high current conditions than does the first parallel-connected ESD blocking device; (iii) the first parallel-connected ESD blocking device is a Schottky diode and the second parallel-connected ESD blocking device is a PN diode; and/or (iv) the first parallel-connected ESD blocking device is a DWFET and the second parallel-connected ESD blocking device is a PN diode.

Figure 7:
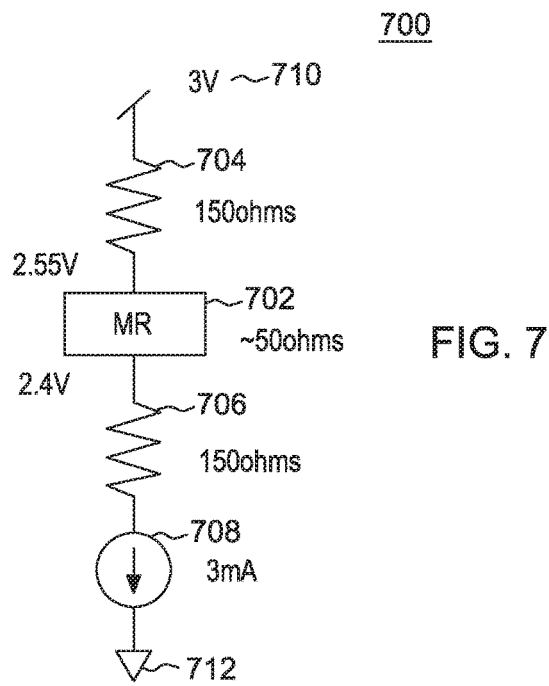
FIG. 7 is an electrical schematic view of circuitry helpful in understanding various embodiments of the present invention.

As shown in FIG. 7, ESD magnetoresistive (MR) circuitry 700 includes: Magnetoresistive (MR) sensor 702; biasing resistor 704; biasing resistor 706; and current value 708; 3V voltage source 710; and ground 712. This circuit represents a conventional MR sensor operational circuit without ESD protection circuitry. The current and voltage values shown in FIG. 7 demonstrate MR biasing in normal operation, which is helpful in understanding the embodiments of the present invention to be discussed in the following paragraphs.

Figure 8:
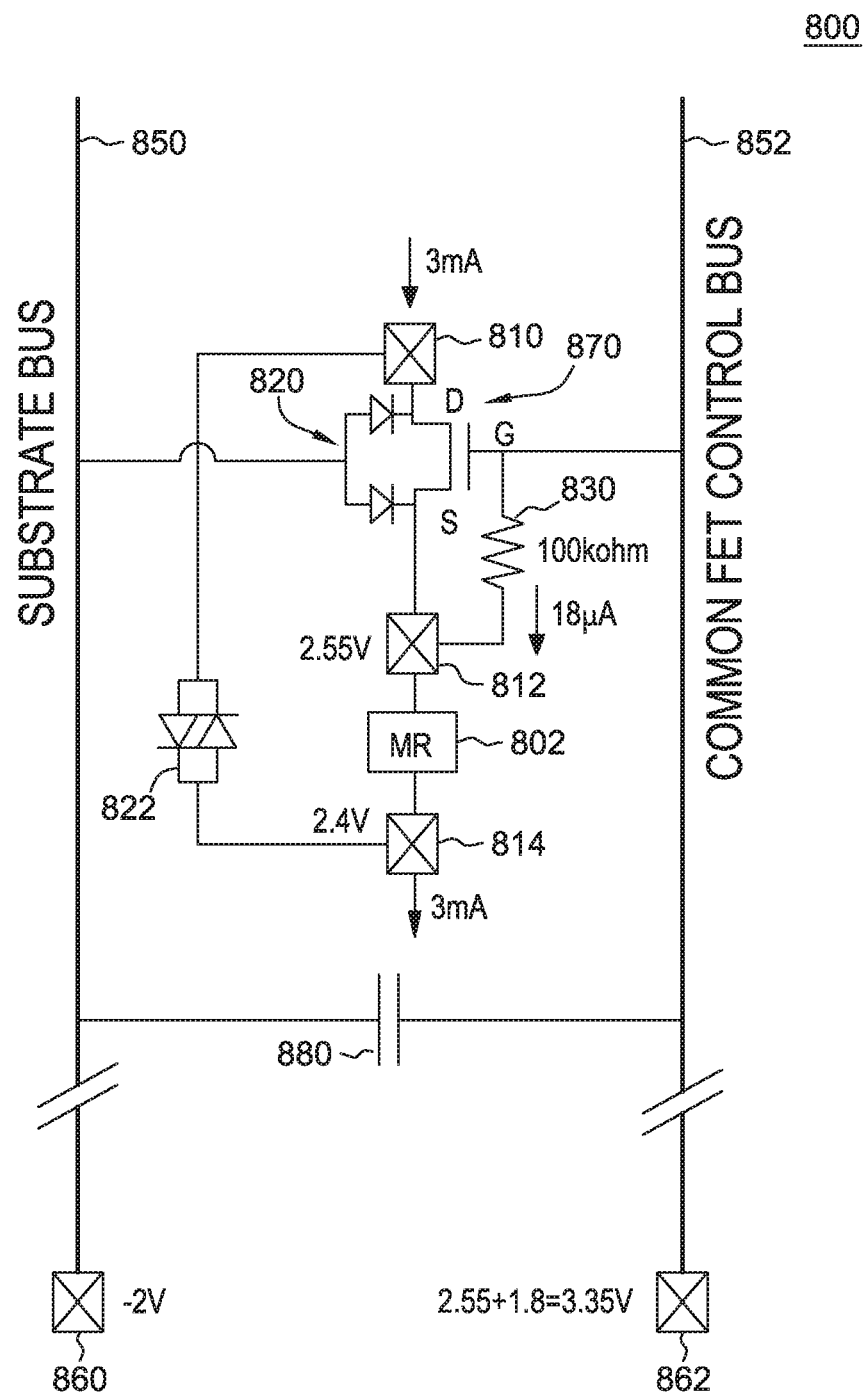
FIG. 8 is an electrical schematic view of a sixth embodiment of ESD protection circuitry according to the present invention.

As shown in FIG. 8, ESD protection circuitry 800 includes: Magnetoresistive (MR) sensor 802; circuit connection points 810, 812, 814, 860, 862; diode pair 820; forward and reverse diode pair 822; biasing resistor 830; substrate bus 850; common FET control bus 852; NFET 870; and optional stabilization capacitor 880.

Some embodiments of the present invention may further include one, or more, of the following features, characteristics and/or advantages with respect to FIG. 8, ESD protection circuitry 800: (i) the circuit has low impedance access to MR during normal operation; and (ii) the circuit has a higher (larger) impedance during ESD, where the current is redirected to the ESD protection diodes.

Some embodiments of the present invention may further include one, or more, of the following "modes of operation" with respect to FIG. 8, ESD protection circuitry 800: (i) normal operation mode where FET 870 is turned on and there is a low voltage drop across this FET; (ii) mode where positive ESD is on the top pad (circuit connection point) 810 or negative ESD is on the bottom pad (circuit connection point) 814; and (iii) mode where negative ESD is on the top pad (circuit connection point) 810 or positive ESD is on the bottom pad (circuit connection point) 814.

Further with regard to item (ii) in the paragraph above: (i) the FET 870 is off and takes the entire voltage drop; and (ii) the ESD current goes through the "forward biased diode" of forward and reverse diode pair 822, bypassing the MR sensor 802.

Further with regard to item (iii) two paragraphs above: (i) the FET 870 is diode connected and acts as a diode; (ii) the current is divided between two legs where most of the current flows through the forward biased diode 822 and some of the current flows through the MR sensor 802 and diode connected FET 870; and (iii) this circuit uses a combination of an active FET 870 and passive diodes 822.

Some embodiments of the present invention may further include one, or more, of the following variations with respect to ESD protection circuitry 800, where the diodes can be: (i) PN diodes; (ii) PIN (p-type, intrinsic, n-type) diodes; (iii) Schottky diodes; and/or (iv) diode connected FETs. Further, FET 870 can be a PFET (p-type field effect transistor). The PFET: (i) might be easier to turn on ($V_{ctrl}$=0V); and (ii) may be more resistive.

Figure 9:
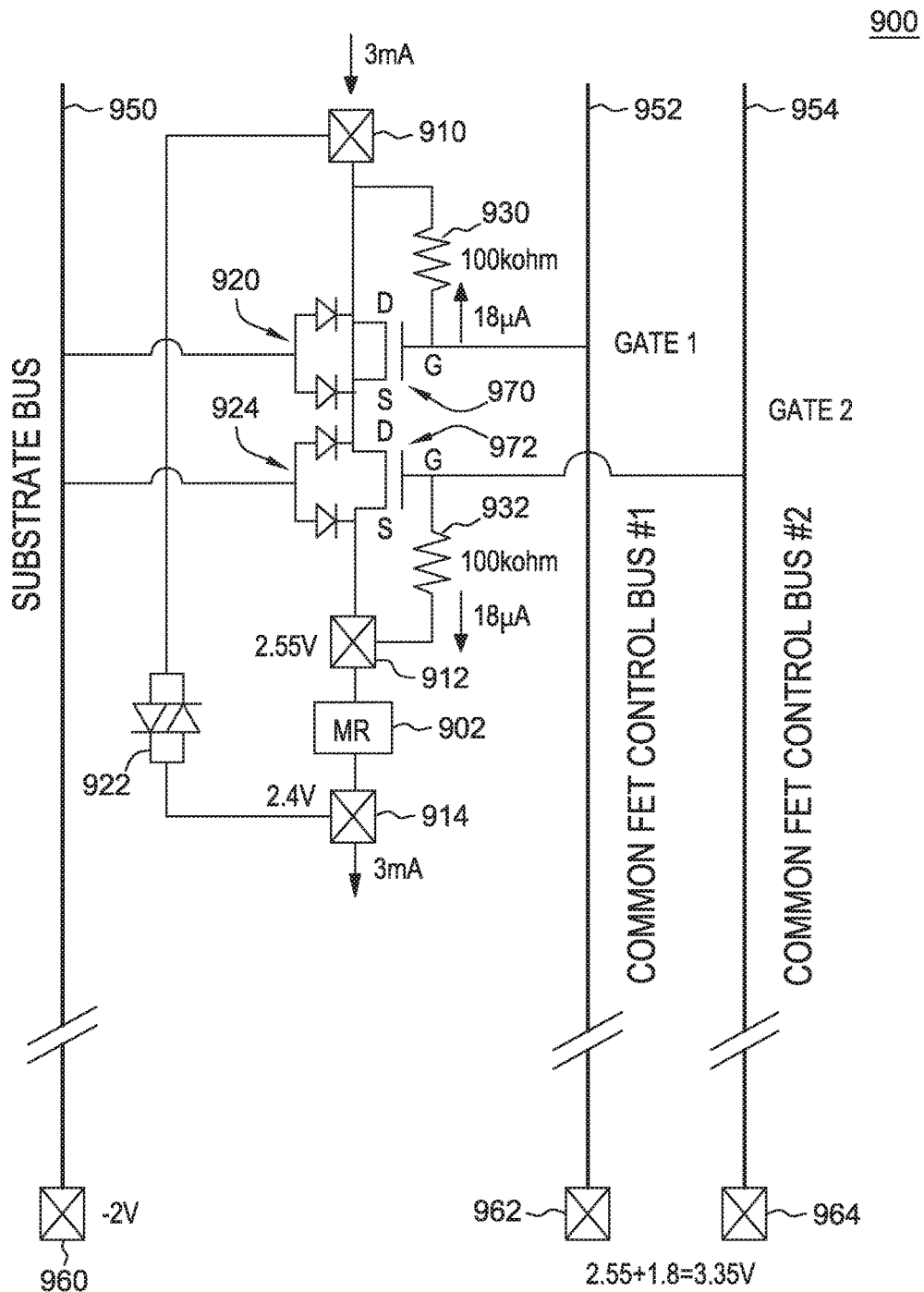
FIG. 9 is an electrical schematic view of a seventh embodiment of ESD protection circuitry according to the present invention.

As shown in FIG. 9, ESD protection circuitry 900 includes: Magnetoresistive (MR) sensor 902; circuit connection points 910, 912, 914, 960, 962, 964; diode pairs 920, 924; forward and reverse diode pair 922; biasing resistors 930, 932; substrate bus 950; common FET control bus #1 952; common FET control bus #2 954; NFET 970 (Gate 1); and NFET 972 (Gate 2). This circuit is an alternative to circuit 800 shown in FIG. 8.

Some embodiments of the present invention may further include one, or more, of the following features, characteristics and/or advantages with respect to FIG. 9, ESD protection circuitry 900: (i) the circuit has low impedance access to MR during normal operation; and (ii) the circuit has very large (high) impedance during both "positive (+)" and "negative (−)" ESD.

Some embodiments of the present invention may further include the following "modes of operation" with respect to FIG. 9, ESD protection circuitry 900: (i) normal operation mode; (ii) positive zap mode (positive ESD pulse or discharge); and (iii) negative zap mode (negative ESD pulse or discharge).

Further with regard to item (i) in the paragraph above: (i) FETs 970 and 972 are both turned on and there is a low voltage drop; and (ii) most of the current flows through the MR sensor 902.

Further with regard to item (ii) two paragraphs above: (i) when FET 972 is turned off, current is blocked through the MR sensor 902; and (ii) all current leakage passes through forward and reverse diode pair 922.

Further with regard to item (iii) three paragraphs above: (i) when FET 970 is turned off, current is blocked through the MR sensor 902; and (ii) all current leakage passes through forward and reverse diode pair 922.

As shown in FIG. 10, graph 1000 illustrates the IV (current voltage) curves for an ESD protection circuit. This graph shows the data curves for the following devices: (i) a 345 µm (micrometer) diode; (ii) a 200 µm FET where the FET is off; (iii) a 200 µm FET diode connected; and (iv) a 200 µm FET where the FET is on.

Some embodiments of the present invention may further include one, or more, of the following features, characteristics and/or advantages during "normal operation mode" where the FET is actively turned on: (i) the impedance of the FET is low; (ii) the FET can be made smaller than a diode; (iii) the FET can be made smaller than a diode connected FET; and (iv) capacitance is reduced.

Some embodiments of the present invention may further include one, or more, of the following features, characteristics and/or advantages during "ESD protection mode": (i) the FET is not fully on (either off or diode connected, depending on pulse polarity and method chosen); and (ii) the larger impedance during ESD protection re-directs the current away from the MR sensor.

As shown in FIG. 11, table 1100 shows and compares the ESD characteristics for the following ESD models: (i) human body model (HBM); (ii) machine model (MM); and (iii) charged device model (CDM). The information outlined in table 1100 may be useful by a circuit designer who is designing a MR sensor ESD protection circuit according to some embodiments of the present invention. Further, details of the ESD models outlined above will now be discussed further in the below paragraphs.

Figure 12:
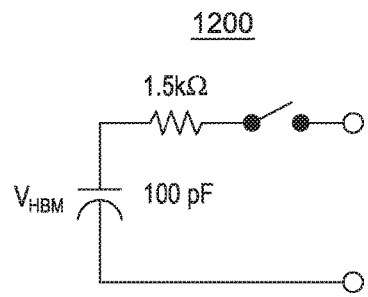
FIG. 12 is an electrical schematic view of circuitry helpful in understanding various embodiments of the present invention.

As shown in FIG. 12, circuitry 1200 includes: 1.5KΩ (thousand ohm) resistance element; 100 pF (picofarad) capacitance element; $V_{HBM}$ voltage element; and a switch element. Circuitry 1200 represents the equivalent electrical circuit for a human body (human body model (HBM)) during an ESD discharge, where the discharge is between two (2) points, an IC (integrated circuit) and a human body. For HBM protection of an MR element, the lower the effective resistance of the device during the ESD event, the higher the HBM voltage. A simple example would be protecting a 500Ω device which fails at 0.5 V. The failure current would be 500 mV/500Ω, or 1 mA. 1 mA through 2,000Ω (1,500+500Ω) requires a voltage of 2 V for an HBM failure level. Using design 8 to protect the 500Ω MR element requires a total of 17 mA through D1-MR and D2 to achieve the 500 mV across the MR element, which translates to approximately 25.5 V HBM failure level, or a factor of 12.8 compared to the unprotected sensor.

Some embodiments of the present invention may further include one, or more, of the following features, characteristics and/or advantages pertaining to the ESD discharge with the HBM: (i) exhibits a relatively slow rise time (approximately 5 ns to 10 ns with a pulse width of approximately 150 ns); (ii) exhibits unidirectional current (approximately 1 A to 3 A); (iii) $I_{HBM}=V_{HBM}/1500V$ (for example: at 2 KV (2000V), HBM=1.3 A of current); and (iv) electrically, is equivalent to a current source.

Some embodiments of the present invention may further include one, or more, of the following features, characteristics and/or advantages for the HBM using a typical IC test method by performing: (i) a positive polarity test from each pin to each power supply and ground domain; (ii) a negative polarity test from each pin to each power supply and ground domain; (iii) a positive polarity test between all power and ground domains; (iv) a negative polarity test between all power and ground domains; and (v) a positive polarity test between representative pairs of signal pins.

Figure 13:
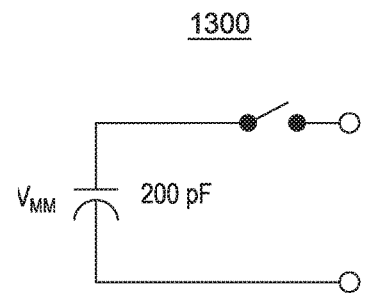
FIG. 13 is an electrical schematic view of circuitry helpful in understanding various embodiments of the present invention.

As shown in FIG. 13, circuitry 1300 includes: 200 pF (picofarad) capacitance element; $V_{MM}$ voltage element; and a switch element. Circuitry 1300 represents the equivalent electrical circuit for a machine model (MM) during an ESD discharge, where the discharge is between an IC (integrated circuit) and a machine tool.

Some embodiments of the present invention may further include one, or more, of the following features, characteristics and/or advantages pertaining to the ESD discharge with the MM: (i) exhibits a rapid ESD event; (ii) exhibits additional series inductance (0.5 µH (micro henries) to 1.0 µH); (iii) exhibits high currents (approximately 3 A to 5 A); (iv) when tested at 200V, the MM exhibits a current level of 2.8 A to 3.8 A; and (v) ESD is bidirectional, where the current oscillates into and out of the signal pin.

Some embodiments of the present invention may further include one, or more, of the following features, characteristics and/or advantages for the MM using a typical IC test method by performing: (i) a positive polarity test from each pin to each power supply and ground domain; (ii) a negative polarity test from each pin to each power supply and ground domain; (iii) a positive polarity test between all power and ground domains; (iv) a negative polarity test between all power and ground domains; and (v) a positive polarity test between representative pairs of signal pins. The testing method described above for the MM is similar to the testing method for the HBM.

Figure 14:
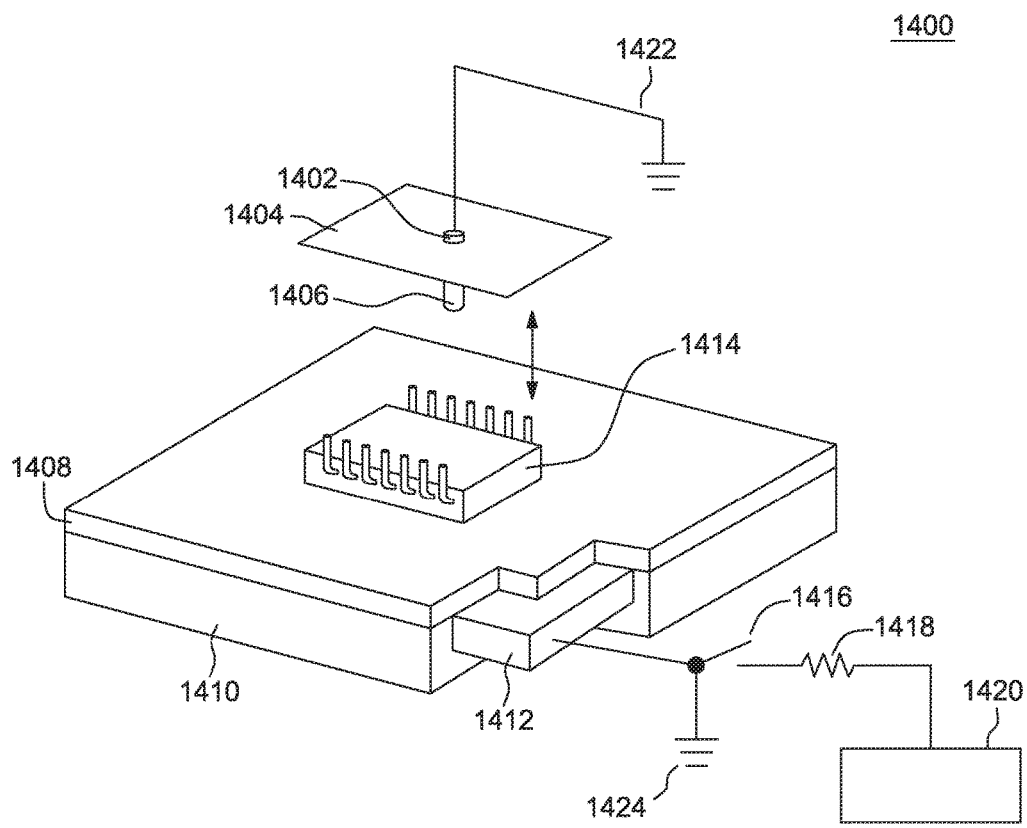
FIG. 14 is a perspective view of a eighth embodiment of ESD protection circuitry according to the present invention.

As shown in FIG. 14, partially cutaway CDM (charged device model) tester circuitry 1400 includes: 1Ω disk resistor 1402; discharge plate 1404; discharge probe 1406; insulator 1408; insulating fixture 1410; field charging electrode 1412; device 1414; switch 1416; 1 GΩ (gigaohm) resistor 1418; regulated high voltage supply 1420; circuit grounds 1422, 1424. CDM tester 1400 represents the discharge of a module that has been electrically charged via: (i) the turboelectric effect (frictional charging); or (ii) an external electrical field. ESD testing can be performed by having the CDM test module 1400: (i) in a socketed fixture; or (ii) as a bare module (non-socketed).

Some embodiments of the present invention may further include one, or more, of the following features, characteristics and/or advantages for the CDM using a typical IC (integrated circuit) test method by: (i) charging the module to a positive value; (ii) charging the module to a negative value; (iii) discharging from each pin; and (iv) repeating items (i), (ii), and (iii) above at a higher voltage.

As shown in FIG. 15, table 1500 shows: (i) the three ESD models (HBM, MM, CDM); (ii) three associated ESD voltage levels (in volts) for each model; and (iii) the resulting peak current magnitude (in amps). The information outlined in table 1500 may be useful by a circuit designer who is designing a MR sensor ESD protection circuit according to some embodiments of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Electrically Connected: means either directly electrically connected, or indirectly electrically connected, such that intervening elements are present; in an indirect electrical connection, the intervening elements may include inductors and/or transformers.

Series-connected diode: an ESD device electrically connected (or adapted to be electrically connected) in series with the target device; series-connected ESD blocking devices may be connected in parallel with each other so long as they are (or are adapted to be) electrically connected in series with the target device.

Parallel-connected diode: an ESD device electrically connected (or adapted to be electrically connected) is "effective resistance" in series with the target device; parallel-connected ESD blocking devices may be connected in series with each other so long as they are (or are adapted to be) electrically connected in parallel with the target device.

Diode: any electrical component, or set of electrical components, that operates as a diode, regardless of whether the electrical component(s) are commonly called a "diode."

Diode type: refers to categories of diodes that are fundamentally different in their principles and/or mechanisms of operation; different "diode types" include: Schottky, P N, diode-connected NFET, diode-connected PFET and diodes that exploit nanostructures (for example, diodes made with carbon nanotubes); merely having different performance characteristics does not mean that two diodes have different "diode types" as that term is used herein.

Effective resistance: Ohmic resistance and/or other types of effective resistance (such as effective resistance associated with DWFETs).

What is claimed is:

1. Electrostatic discharge (ESD) protection circuitry for protecting a magnetoresistive (MR) sensor from electrostatic events, the ESD protection circuitry comprising:
   a first series-connected field-effect transistor (FET), the first-series connected FET including a gate, a source and a drain; and
   a second series-connected field-effect transistor (FET), the second-series connected FET including a gate, a source and a drain where the source of the second series-connected FET is connected to the drain of the first series-connected FET and the gate of the second-series connected FET is electrically connected to the drain of the second series connected FET; and
   control circuitry;
   wherein:
   the first series-connected FET is adapted to be electrically connected in series with the MR sensor;
   the control circuitry is structured, connected and/or programmed to turn on the gate of the first series-connected FET during operation of the MR sensor; and
   the gate of the first series-connected FET is electrically connected to the source of the first series-connected FET.

2. The circuitry of claim 1 further comprising:
   a first parallel ESD path;
   wherein:
   the first parallel ESD path is electrically connected in parallel with the MR sensor and the first series-connected FET; and
   the first parallel ESD path is structured, connected and/or located to be capable of re-directing current associated with an ESD event away from the first series-connected FET and the MR sensor.

3. The circuitry of claim 2 wherein the first parallel ESD path includes at least one of the following electrical components: a PN diode, a diode-connected FET and/or a Schottky diode.

4. The circuitry of claim 2 wherein: the first parallel ESD path is structured, connected and/or located to be capable of re-directing current associated with an ESD event away from the first series-connected FET and the MR sensor.

5. The circuitry of claim 1, wherein the second series-connected FET is adapted to be electrically connected in series with the MR sensor.

6. The circuitry of claim 1, wherein the control circuitry is further structured, connected and/or programmed to turn on the gate of the second series-connected FET during operation of the MR sensor.

7. Electrostatic discharge (ESD) protection circuitry for protecting a magnetoresistive (MR) sensor from electrostatic events, the ESD protection circuitry comprising:
   a first series-connected field-effect transistor (FET), the first-series connected FET including a gate, a source and a drain where the source of the first series-connected FET is connected to the top lead of the MR sensor;
   a second series-connected field-effect transistor (FET), the second-series connected FET including a gate, a source and a drain where the source of the second series-connected FET is connected to the drain of the first series-connected FET; and
   control circuitry;
   wherein:
   the first series-connected FET is adapted to be electrically connected in series with the MR sensor; and
   the control circuitry is structured, connected and/or programmed to turn on the gate of the first series-connected FET during operation of the MR sensor;
   the gate of the first series-connected FET is electrically connected to the source of the first series-connected FET;
   the second series-connected FET is adapted to be electrically connected in series with the MR sensor;
   the control circuitry is further structured, connected and/or programmed to turn on the gate of the second series-connected FET during operation of the MR sensor; and
   the gate of the second series-connected FET is electrically connected to the drain of the second series-connected FET.

8. The circuitry of claim 7
   a first parallel ESD path;
   wherein:
   the first parallel ESD path is electrically connected in parallel with the series connection formed by the MR sensor and the first series-connected FET and the second series connected FET; and
   the first parallel ESD path is structured, connected and/or located to be capable of re-directing current associated with an ESD event away from the first series-connected FET and the MR sensor.

9. The circuitry of claim 8 wherein the first parallel ESD path includes at least one of the following electrical components: a PN diode, a diode-connected FET and/or a Schottky diode.

10. The circuitry of claim 7 wherein the first series-connected FET is an NFET.

11. The circuitry of claim 7 wherein the first series-connected FET is a PFET.

12. The circuitry of claim 7 wherein:
   the gate of the first series-connected FET is electrically connected to the source of the first series-connected FET through a resistor;
   the gate of the second series-connected FET is electrically connected to the drain of the second series-connected FET through a resistor.

* * * * *